United States Patent

Akao

[11] Patent Number: 5,401,562
[45] Date of Patent: Mar. 28, 1995

[54] PAPER MATERIAL FOR PHOTOSENSITIVE MATERIALS AND METHOD OF PRODUCING THE SAME

[75] Inventor: Mutsuo Akao, Kanagawa, Japan

[73] Assignee: Fuji Photo Film Co., Ltd., Kanagawa, Japan

[21] Appl. No.: 37,406

[22] Filed: Mar. 26, 1993

[30] Foreign Application Priority Data

Mar. 27, 1992 [JP] Japan .................. 4-071164

[51] Int. Cl.$^6$ .............................................. B32B 3/00
[52] U.S. Cl. ........................... 428/211; 428/195;
428/215; 428/317.1; 428/319.7; 428/511;
428/516
[58] Field of Search .............. 428/215, 317.1, 319.7,
428/511, 515, 516, 201, 211; 430/530; 427/439;
206/381

[56] References Cited

U.S. PATENT DOCUMENTS

| | | | |
|---|---|---|---|
| 4,565,733 | 1/1986 | Akao | 428/215 |
| 4,576,865 | 3/1986 | Akao | 428/335 |
| 4,584,234 | 4/1986 | Hirose et al. | 428/323 |
| 4,876,125 | 1/1988 | Akao et al. | 428/35.2 |
| 4,906,517 | 3/1990 | Akao et al. | 428/216 |
| 4,915,229 | 4/1990 | Yamada et al. | 206/455 |
| 4,988,559 | 1/1991 | Nemoto et al. | 428/219 |
| 5,017,429 | 5/1991 | Akao | 428/349 |
| 5,026,600 | 6/1991 | Akao | 428/328 |
| 5,110,643 | 5/1992 | Akao et al. | 428/35.9 |
| 5,275,283 | 1/1994 | Akao | 206/409 |

Primary Examiner—Patrick J. Ryan
Assistant Examiner—William A. Krynski
Attorney, Agent, or Firm—Burns, Doane, Swecker & Mathis

[57] ABSTRACT

A paper material for photosensitive materials consisting essentially of a paper support and a coextruded multilayer extrusion laminating layer laminated onto the paper support. The coextruded multilayer extrusion laminating layer has an adhesive layer comprising less than 5 wt. % of carbon black and 5 to 90 wt. % of acid-modified adhesive polyolefin resin that is adhered to the paper support and a surface layer comprising less than 3 wt. % of carbon black and more than 10 wt. % of ethylene copolymer resin. The paper material does not induce fogging, sensitivity deviation or the like upon photosensitive materials and has a great adhesive force between the paper support and the resin layer. A method for producing the paper material is also disclosed.

14 Claims, 3 Drawing Sheets

PAPER MATERIAL FOR PHOTOSENSITIVE MATERIALS AND METHOD OF PRODUCING THE SAME

BACKGROUND OF THE INVENTION

This invention relates to a paper material for photosensitive materials, such as light-shielding paper wound together with a rolled photosensitive material, a support used for a photographic printing paper or an instant film, or the like, and a method of producing the same.

Conventional light-shielding papers wound together with rolled photosensitive material are light-shielding black paper or a paper support on which an EVA resin solution containing more than 5 wt. % of carbon black dissolved in a solvent such as toluene is coated by gravure coating.

The light-shielding paper produced by coating an EVA resin solution onto a paper support is excellent in flexibility and conductivity, and the adhesive force between the EVA resin layer and the paper support is sufficient. However, it is necessary to evaporate the solvent such as toluene, and accordingly explosionproof equipment which is expensive is necessary. Moreover, unless the coating is less than 50 m/min., membrane rupture, pinholes or craters which render moistureproofness and light-shielding incomplete occur on the coating layer due to air contained in the paper support. Thus, the above light-shielding paper is inferior with respect to its low manufacturing rate and manufacturing cost. Furthermore, the residual solvent therein induces blocking between not only the photosensitive layer and the light-shielding paper of the rolled photosensitive material but also between the light-shielding papers in a wound state, with fogging, sensitivity deviation or the like of the photosensitive material, lump troubles caused by aggregation of carbon black occurring during the long coating process.

The applicant has investigated in order to resolve the above problems, and proposed a light-shielding paper formed by extrusion-laminating a polyethylene resin layer composed of a high density polyethylene resin and a low density polyethylene resin blended with carbon black onto a paper support (Japanese Patent KOKAI No. 60-35728).

Recently, a water-resistant support formed of a paper support having both sides coated by a polyolefin resin has gradually been utilized as the support for photographic printing paper instead of baryta paper according to the speeding up of development. The support for photographic printing paper is provided with a transparent or translucent polyolefin resin extrusion laminating layer on one side and with an opaque polyolefin resin extrusion laminating layer containing a white pigment which is light-reflective light-shielding material, such as titanium dioxide, on the other side. A photoemulsion layer is provided on the opaque polyolefin resin extrusion laminating layer to form photographic printing paper. Negative images are printed on the photographic printing paper, and then developed to obtain the printing paper having positive images. The printing paper is then cut into a prescribed size by a cutter or the like.

Shear force is added to the printing paper produced from the above support having the polyolefin resin extrusion laminating layer between the upper and lower blades of the cutter during cutting, and at that time, the printing papers have mostly not a simple cut end but an elongated one which degrades the appearance of the printing paper resulting in a reduction of its commercial value.

A method of using a low molecular weight polyethylene resin for the polyolefin resin extrusion laminating layer is proposed as a means to improve the cutability (Japanese Patent KOKOKU No. 58-41500).

However, the printing paper provided with the polyolefin resin extrusion laminating layer formed of the low molecular weight polyethylene resin tends to be damaged by contacting a metal portion or the like during traveling in a printer, a developing apparatus or the like, and moreover, it is inferior in resistance to curling.

Heretofore, various techniques have been proposed, for example, the method of using a high density polyethylene resin having specific molecular structure and properties (Japanese Patent KOKAI No. 58-95731), the method of using a polyethylene resin blend wherein a high density polyethylene resin having specific properties and a low density polyethylene resin having a specific properties are blended at a specific ratio (Japanese Patent KOKAI Nos. 60-150049, 63-237055).

The above conventional light-shielding paper formed of a paper support on which a polyethylene resin layer is laminated by extrusion laminating can be produced inexpensively because it does not require expensive explosionproof equipment, and does not induce fogging or the like on photosensitive materials.

However, when more than 5 wt. % of carbon black is blended in order to improve light-shielding and conductivity, adhesion between the polyethylene resin layer and the paper support becomes inferior. Moreover, foaming, film rupture and pinholes occur by the influence of moisture adsorbed on the carbon black. In the case that the thickness of the laminating layer is less than 40 μm, film rupture and pinholes are particularly liable to occur. Furthermore, when the paper support has a great surface irregularity, a high moisture content or a small density, film rupture, pinholes or inferior adhesion are liable to occur by the influence of air or water vapor.

The aforementioned conventional support for photographic printing paper is excellent in cutting properties and resistance to abrasion due to the process of high density polyethylene resin. However, it is inferior in insufficient adhesive strength, great neck-in and has insufficient resistance to curling. Particularly, in the case of blending more than 3 wt. % of white pigment for the purpose of the improvement in shielding ability, particularly more than 5 wt. % for the purpose of the improvement in sharpness, there are problems of insufficient adhesive force and neck-in.

SUMMARY OF THE INVENTION

An object of the invention is to provide a paper material for photosensitive materials which does not induce fogging, sensitivity deviation or the like upon photosensitive materials and which has a great adhesive force between the paper support and the resin layer, and a method of producing the same.

Another object of the invention is to provide a paper material for photosensitive materials which is excellent in light-shielding, cutability and adhesive strength, and no occurrence of film cracking, film rupturing, pinholes and the like in order to ensure complete light-shielding, when it is used as a light-shielding paper for packaging photosensitive materials.

Another object of the invention is to provide a paper material for photosensitive materials which is excellent in cutting properties, adhesive strength and sharpness and has low neck-in and low tendency for curling, when it is used as a support for photographic printing paper.

Another object of the invention is to provide a paper material for photosensitive materials which improves printability and is excellent in light-shielding, adhesive strength, obverse-reverse discrimination, photographic properties, resistance to curling and cutting properties.

The present invention provides paper materials which have achieved the above objects, comprising a paper support and a coextruded multilayer extrusion laminating layer, wherein the coextruded multilayer extrusion laminating layer comprises an adhesive layer containing less than 5 wt. % of carbon black and 5 to 90 wt. % of acid-modified adhesive polyolefin resin adhered to the paper support and a surface layer containing more than 3 wt. % of carbon black and more than 10 wt. % of an ethylene copolymer resin having a melt index (ASTM D-1238, measuring temperature: 190° C.) of more than 2 g/10 minutes. The paper material is particularly suitable as a light-shielding paper wound together with a rolled photosensitive material and the like.

Figure 1:
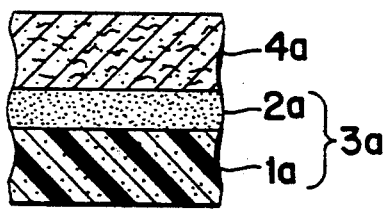
FIGS. 1 through 10 are partial sectional views illustrating layer constructions of the paper material for photosensitive materials of the invention.

1,1a ... Surface layer in a coextruded multilayer extrusion laminating layer 2,2a ... Adhesive layer in a coextruded multilayer extrusion laminating layer 3,3a ... Coextruded multilayer extrusion laminating layer 4,4a ... Paper support 5 ... Print layer 6,6a ... Intermediate layer in a coextruded multilayer extrusion laminating layer 7,7a ... Protective layer (lacquer coating layer)

8,8a ... Thermoplastic resin extrusion laminating layer 10,10a ... Polyolefin resin layer in a coextruded multilayer extrusion laminating layer containing 5-95 wt. % of a high density homopolyethylene resin having a density of more than 0.940 g/cm$^3$ 11,11a .. Coextruded multilayer extrusion laminating layer containing the polyolefin resin layer 10,10a a ... Indicating the presence of light-shielding material

DETAILED DESCRIPTION OF THE INVENTION

The paper support of the paper material of the invention may be various bleached, semibleached or unbleached papers or coated papers which do not affect photosensitive materials adversely. The thickness of the paper support is 30 to 150 μm, preferably 45 to 120 μm, particularly preferably 60 to 100 μm, and the areal weight is 30 to 120 g/m$^2$, preferably 50 to 100 g/m$^2$, particularly preferably 60 to 90 g/m$^2$. As the paper support for photographic printing paper, the thickness is preferably 55 to 330 μm, particularly preferably 110 to 220 μm, and the areal weight is preferably 50 to 300 g/m$^2$, particularly preferably 100 to 200 g/m$^2$. The density is preferably 0.7 to 1.3 g/cm$^3$, more preferably 0.8 to 1.2 g/cm$^3$.

In order to improve the yield of light-shielding material and fine fibers during paper making of the paper support, it is preferable to add an inorganic material having ion-exchange ability. The inorganic materials having ion-exchange ability include zeolite including natural zeolite, such as analcime, erionite, mordenite, and synthetic zeolite in a form of A,N-A,X,Y, hydroxy sodalite, B,R,T, hydroxy cancrinite or the like. A suitable mean particle size is less than 7 μm, preferably less than 5 μm, particularly preferably 0.1 to 3.5 μm in order to decrease abrasion. The content is 0.1 to 10 wt. %, preferably 0.7 to 8 wt. %, particularly preferably 0.5 to 6 wt. % per the weight of the paper support. Other inorganic materials having ion-exchange ability are diatomeceous earth activated clay, synthetic aluminum silicate, synthetic calcium silicate, synthetic magnesium silicate, mica, bentonite and the like, and the conetent is 0.1 to 10 wt. %, preferably 0.3 to 8 wt. %, particularly preferably 0.5 to 6 wt. %.

The yield of light-shielding material and fine fibers is further improved by 5 to 30% by combining a cationic water-soluble polymer (cationic starch, cationic polyacrylamide, etc.) or an anionic water-soluble polymer (anionic polyacrylamide, etc.) in an amount of 0.01 to 5 wt. %, preferably 0.05 to 3 wt. % to the inorganic material.

As the black paper support for light-shielding paper requiring complete light-shielding ability, the black paper support containing 1 to 15 wt. % of oil furnace carbon black having a mean particle size of 15 to 80 mμ, and 0.1 to 10 wt. % of synthetic zeolite having a mean particle size of 0.1 to 5 μm is particularly preferred. It is further preferred that 0.01 to 5 wt. % of cationic water-soluble polymer and 0.1 to 2 wt. % of black or blue cationic dye (dyes in diaryl methanes, triaryl methanes, thiazoles, methines, xanthenes, oxaines, thiazines, azos, and anthraquinones, etc.) are further blended into the above black paper support. The cationic dye acts to fix oil furnace carbon black into the paper support.

The paper support is formed of not only natural pulp as the principal component but also a mixture of natural pulp with synthetic fiber or synthetic pulp at an arbitrary rate. Moreover, it may contain a suitable amount of regenerated pulp obtained by recycling which has recently been promoted as a measure against pollution, and may be a multilayer paper wherein a paper layer composed of regenerated pulp is combined with a paper layer composed of natural pulp. In any event, the paper support preferably contains more than 70 wt. % of wood pulp.

Preferable natural pulp is wood kraft pulp, such as softwood pulp (NP), hardwood pulp (LP) or softwood hardwood mixture pulp (NLP). The kraft pulp may be produced by any cooking process of polysulfide cooking, batchwise cooking or continuous cooking, and may be produced with a suitable degree of hardening or a kappa number. The kraft pulp may be produced by the oxygen pulping method disclosed in Japanese Patent KOKOKU No. 59-38575. The paper support may be synthetic paper made of synthetic resin which is preferable for the invention in view of photographic properties, dimensional accuracy, strength and the like, although it is expensive.

Particularly preferable wood kraft pulp is manufactured by cooking wood chips under turbid conditions containing sodium hydroxide and sodium sulfide as chemical components, removing lignins, separating into pulp fibers and cooking residue (black liquor), washing and then bleaching. Chemical components of the cooking liquor may contain salts, such as sodium carbonate, sodium sulfate, slaked lime and calcium carbonate, cooking assistant, such as sodium borohydride or anthraquinone compound, or the like, as well as sodium hydroxide and sodium sulfide.

Preferred pulp which is used in a combination with natural kraft pulp is natural pulp, and wood sulfide pulp, such as softwood sulfide pulp, hardwood sulfide pulp or softwood hardwood mixture sulfide pulp is particularly preferred. On the other hand, wood soda pulp, wood dissolving pulp and the like are also usable. These pulps may be unbleached, semibleached or bleached, unless they adversely affect photographic photosensitive materials fatally, and may be selected according to use. Bleached pulp is particularly preferred in view of the value as commercial goods.

A suitable mean fiber length is 0.4 to 0.9 mm, and a suitable mean fiber width is more than 10 μm. A suitable mean fiber thickness is less than 5 μm.

Antifoam or foam inhibitor used during bleaching pulp may be selected from known ones, such as higher fatty alcohol ester compounds, mineral oils, liquid hydrocarbon oil and silicone oil disclosed in Japanese Patent KOKAI Nos. 54-59404, 58-220896, 61-245391, 61-245319, U.S. Pat. Nos. 3,923,638, 4,107,073, etc. Among them, the aqueous based or oil based antifoamers and foam inhibitors containing mineral oil or liquid hydrocarbon oil as the principal component are preferred in view of defoaming and foaming inhibition. The antifoamer and foam inhibitor may contain some components, such as hydrophobic silica, ethylene bis higher alkylamide, silicone oil or the like. As the method of allowing the antifoamer or foam inhibitor to exist in the washing process of unbleached kraft pulp, it is preferable to add the antifoamer or foam inhibitor to the slurry of unbleached kraft pulp or thickner in an arbitrary step of the washing process.

For chlorine bleaching in the production of natural pulp, chlorine gas or chlorine water is used. At that time, chlorine dioxide may be used together. It is advantageous to use caustic soda for alkali treatment or extraction, but calcium hydroxide, ammonia or a mixture thereof may be used. For hypochlorite bleaching, chloride of lime prepared by reacting chlorine with slaked lime in a solid powder state, and industrial viewpoint, hypochlorite bleaching powder (called calcium-hypo bleaching solution, sodium-hypo bleaching solution) prepared by blowing chlorine gas into lime milk or dilute caustic soda solution, are preferable.

For chlorine dioxide bleaching, it is advantageous to use the chlorine dioxide prepared by the sulfite process, such as Mathieson process, new Mathieson process, Elst process or C.I.P. process, or the hydrochride process, such as Kesting process, Nippon Soda process or Solvay process. Preferable peroxides used for peroxide bleaching in alkaline conditions are various, inorganic or organic peroxides, such as hydrogen peroxide, sodium peroxide, peroxide bleaching solution (an aqueous mixture solution composed of hydrogen peroxide, caustic soda, sodium silicate and optional magnesium sulfate), peracetic acid and 1-butylhydroperoxide and mixtures thereof. Preferable alkalines are alkali metal hydroxides and alkaline earth metal hydroxides, such as caustic soda, potassium hydroxide, aqueous ammonia, magnesium hydroxide and calcium hydroxide, and mixtures thereof.

Bleaching conditions can be selected from the conditions disclosed in "Pulp Treatment and Bleaching", Japan Technical Association of the Pulp and Paper Industry, Tokyo, 1968 or Japanese Patent KOKOKU No. 58-43732.

Various additives may be incorporated into the paper support during the preparation of paper stock slurry. The additives include sizing agent, such as fatty acid metal salts, fatty acids, alkylketene dimer emulsions and epoxidized higher fatty amides disclosed in Japanese Patent KOKOKU No. 62-7534, alkenyl or alkyl succinic anhydride emulsions and rosin derivatives, dry paper reinforcing agent, such as anionic, cationic or ampolytic polyacrylamide, polyvinyl alcohol, cationic starch (e.g. Japanese Patent KOKAI No. 3-171042) and vegetable galactomannan, wet paper reinforcing agent, such as polyamine polyamide epichlorohydrin resin, filler, such as clay, kaolin, calcium carbonate and titanium oxide, fixer, such as water-soluble aluminum salts, e.g. aluminum chloride and argillaceous earth sulfate, pH adjuster, such as caustic soda, sodium carbonate and sulfuric acid, coloring pigment, dye, fluorescent brightening agent, etc. disclosed in Japanese Patent KOKAI Nos. 63-204251, 1-266537, etc.

The paper support may also contain various other additives, such as water-soluble polymer, latex, emulsion, antistatic agent and the like according to various coating method, spraying, tub size, size press or the like.

As the water-soluble polymer, there are starch polymers, polyvinyl alcohol polymers, gelatin polymers, polyacrylamide polymers and cellulose polymers disclosed in Japanese Patent KOKAI No. 1-266537, and the like. As the antistatic agent, there are various conductive materials, such as nonionic surfactants represented by polyoxyethylene glycol, anionic surfactants, cationic surfactants represented by quaternary ammonium salts, amphoretic surfactants, alkylamine derivatives, fatty acid derivates, various lubricants, carbon black, graphite, metal surface coating pigment, metal powder, metal flake, carbon fiber, metal fiber, whisker (potassium titante, aluminum nitride, alumina), etc. As actual compounds, there are alkali metal salts, such as sodium chloride and potassium chloride, alkaline earth metal salts, such as calcium chloride and barium chloride, colloidal metal oxides, such as colloidal silica, organic antistatic agents, such as polystyrene sulfonate, and the like.

As the latex and emulsion, there are petroleum resin emulsion, latexes of styrene-acrylic acid-acrylate ester copolymer, styrene-acrylic acid-butadiene copolymer, ethylene-vinyl acetate copolymer, styrene-maleic acid-acrylate ester copolymer or the like. As the pigment, there are clay, kaolin, talc, barium sulfate, titanium oxide, and the like, and as the pH adjuster, there are hydrochloric acid, phosphoric acid, citric acid, caustic soda, and the like. Moreover, the aforementioned coloring pigment, coloring dye, fluorescent brightening agent, and the like may be added.

Particularly preferred paper supports include those made by paper-making a paper stock adjusted to pH 5.5 to 6.5 containing epoxidized fatty amide, adjusting the moisture content to 1 to 4 wt. %, sizing the surface using an aqueous alkali solution, and adjusting the pH of the paper surface to 7 to 8 (Japanese Patent Application No. 4-97365).

Preferable papers used as the paper support in the invention have a smooth surface of which the Bekk smoothness is more than 90 seconds according to JIS P 8119, and those having a smooth surface of more than 120 seconds are particularly preferred.

As the method of manufacturing a paper having a Bekk smoothness of more than 90 seconds, in general, hardwood pulp is used abundantly which is formed of short fibers and makes easily smoothness, and pulps are beaten with a beater so that long fibers decrease as little as possible. The hardwood content of the pulp is preferably 30 to 100 wt. % of wood pulp. As the beating conditions, it is preferable that the rate on 42 mesh becomes 20 to 45% as an indicator of fiber length, and the drainage rate becomes 20 to 350 CSF. Subsequently, the paper stock slurry blended with internal additives is made into paper by using a conventional papermaking machine, such as Fourdrinier machine or cylinder machine according to the papermaking method disclosed in Japanese Patent KOKAI Nos. 58-37642, 61-260240, 61-284762 or other suitable methods so as to obtain a uniform formation, and then providing calendering using a machine calender, supercalender, hot calender or the like to obtain a paper support having a Bekk smoothness of more than 90 seconds.

As the polyolefin resin with which both sides of the paper support are coated, there are homopolyolefins, such as low density polyethylene, medium density polyethylene, high density polyethylene, polypropylene, polybutene and polypentene, ethylene-propylene copolymers, blends thereof, and the like, and low density polyethylene, particularly ethylene-α-olefin copolymer resin having a density of 0.870 to 0.910 g/cm$^3$ are the most preferred. In order to improve laminating ability, it is preferable to blend 1 to 40 wt. %, preferably 3 to 30 wt. %, particularly preferably 5 to 20 wt. %, of a polyethylene resin having a weight average molecular weight of 1,000 to 12,000. The polyethylene resin can be produced by polymerizing ethylene under controlled conditions so as to obtain the above molecular weight, or by thermal cracking of high molecular weight polyethylene resin to decrease the molecular weight. In the case that the coating resin layer of the paper support has a multilayer construction, resins of respective layers may be different in properties or composition, for example, a resin having a MI of 1 to 50 g/10 minutes, preferably 5 to 20 g/10 minutes is used for the surface layer, and a resin having a MI of 1 to 40 g/10 minutes, preferably 2 to 20 g/10 minutes is used for the adhesive layer. As the thermoplastic resins usable in the invention, there are polyolefin resins, such as various low density, medium density, high density or linear low density polyethylene resins and polypropylene resins, polyvinyl resins, such as ethylene-vinyl acetate copolymer resin, acrylic resins, such as ethylene-ethyl acrylate copolymer resin and ethylene-methyl acrylate copolymer resin, rubbers, such as styrene-butadiene rubber, graft copolymer resins, such as ionomers and modified polyolefin resins, polyamide resins, such as nylon, polyester resins, such as polyethylene terephthalate, their blends, copolymers, and the like, disclosed in Japanese Patent KOKOKU No. 51-49205, Japanese Patent KOKAI Nos. 48-22020, 50-67644, 55-140835, 58-17434, 58-186744, 59-68238, 60-35728, etc.

A back coat layer may be provided on the polyolefin resin layer of the paper support for photographic printing paper in the invention. The coating solution to form the back coat layer is usually an aqueous solution, and various alcohols, such as methanol or ethanol, may be added to the solution.

The coating method may be a well known method, such as dip coating, air knife coating, curtain coating or roller coating.

The thickness of the back coat layer is enough to be in a range of 0.1 to 3 μm. Before coating the back coat layer, it is preferable to activate the surface to be coated of the polyolefin resin layer by acid etching, flame treatment by a gas burner, corona discharge, glow discharge or the like.

Furthermore, the light-shielding paper may be provided with letters and marks which are required on the functional view point or with print in order to improve the value as commercial goods. The ink used for printing can be selected from harmless inks to photosensitive materials among conventional inks for offset printing, inks for gravure printing or UV inks.

Representative synthetic resins used or the inks are vinylchloride-vinylacetate copolymer resins, nitrocellulose, polyester, polyamide, polyurethane, polyacrylic resin, rosin-modified maleic acid resin, ethylene-vinyl acetate resin, vinyl ether resin, urethane vinyl acetate resin, vinylchloride-vinylacetate copolymer urethane resin, modified alkyd resin, modified phenol resin, alkali-soluble resins (rosin-modified maleic acid resin, styrene-maleic acid resin, styrene-acrylic acid resin, acrylate ester-acrylic acid resin, methacrylate ester-acrylic acid resin), hydrosol type resins (styrene-maleic acid resin, styrene-acrylic acid resin, α-methylstyrene-acrylic acid resin, acrylate ester-acrylic acid resin, methacrylate ester-acrylic acid resin), emulsion type resins (styrene resin, styrene-acrylate ester resin, acrylate ester copolymer resins, methacylate ester copolymer resins), and the like. As the resins used for UV ink, polymers having acrylic unsaturated groups are, in general, used, and representative examples are polyester/acrylate ester, polyester/urethane resin/acrylate ester, epoxy resin/acrylate ester, pentaerythritol triacrylate, trimethylol propane triacrylate, hexanediol diacrylate, neopentylglycol diacrylate, triethylene glycol diacrylate, hydroxyethyl methacrylate, etc.

Coloring pigments generally known are used for the above inks. The coloring pigments include various pigments disclosed in Japanese Patent KOKAI No. 63-44653, etc., azo pigments, (Azo Lake, Carmine 6B, Red 2B, insoluble azo pigments, Monoazo Yellow (PY-1,-3), Disazo Yellow (PY-12, -13,-14,-17,-83), Pyrazolo Orange (PO-B-34), Vulcan Orange (PO-16), condensed azo pigments, Chromophthal Yellow (PY-93, -95), Chromophthal Red (PR-144,-166)), polycyclic pigments (phthalocyanine pigments, Copper Phthalocyanine Blue (PB-15, -15.1,-15.3), Copper Phthalocyanine Green (PG-7)), dioxane pigments (Dioxane Violet (PV-23)), isoindolinone pigments (Isoindolinone Yellow (PY-109,-110)), durene pigments, perillene, perinone, flavanthrone, thoindigo, lake pigments (Malachite Green, Rhodamine B, Rhodamine G, Victoria Blue B), inorganic pigments, such as oxides (titanium dioxide, red ion oxide), sulfates (precipitated barium sulfate), carbonates (precipitated calcium carbonate), silicates (hydrous silicates, anhydrous silicates), metal powders (aluminum powder, bronze powder, zinc powder), carbon black, lead yellow, Berlin blue, and the like. These pigments may be added to the aforementioned resin layers, paper support or the like as a light-shielding material. In addition, oil-soluble dyes, disperse dyes, and the like are also usable. Other raw materials composing the ink which are optional are various solvents, dispersing agents, wetting agents, antifoamers, leveling agents, thickeners, stabilizers, crosslinking agents, waxes, driers and the like.

A protective layer (also called lacquer coat layer or varnish) may be coated for the surface gloss and the protection of printed portions. Resins usable as the protective layer are acrylic resin, cellulose resin, such as cellulose acetate, urethane resin, epoxy resin, polyester resin, ionomer resin, EEA resin, various polyethylene resins (low density, high density, linear low density polyethylenes, etc.) polypropylene resin, and the like. Wax is also usable.

The coextruded multilayer extrusion laminating layer has an adhesive layer and a surface layer, and may be provided with various layers therebetween. The thickness of the coextruded multilayer extrusion laminating layer for light-shielding paper is preferably 10 to 70 µm, more preferably 20 to 60 µm, most preferably 30 to 50 µm. The thickness of the coextruded multilayer extrusion laminating layer for photographic printing paper is preferably 5 to 70 µm, more preferably 10 to 60 µm, most preferably 20 to 50 µm for each of the obverse side or the reverse side. The reverse side layer is preferably a polyolefin resin layer containing 5 to 95 wt. % of high density homopolyethylene resin having a density of more than 0.940 g/cm$^3$ and/or ethylene-α-olefin copolymer resin 5 to 70 µm in thickness in order to improve cut properties (prevention of barb occurrence), resistance to curling and resistance to abrasion. It may be a coextruded multilayer extrusion laminating layer or a single layer extrusion laminating layer. However, a preferable layer is a coextruded double layer extrusion laminating layer consisting of an adhesive layer containing 5 to 90 wt. %, preferably 8 to 70 wt. %, particularly preferably 10 to 60 wt. % of acid-modified adhesive polyoefin resin and a polyolefin resin layer containing 5 to 100 wt. %, preferably 20 to 100 wt. %, particularly preferably 40 to 100 wt. % of high density homopolyethylene resin having a density of more than 0.940 g/cm$^3$ and/or ethylene-α-olefin copolymer resin, in order to improve the adhesive strength to the paper support, cut properties and the decrease of neck-in. The melt index (MI, measured according to ASTM D-1238 at 190° C.) of the high density homopolyethylene resin having a density of more than 0.940 g/cm$^3$ and/or the ethylene-α-olefin copolymer resin is 5 to 50 g/10 minutes, preferably 7 to 45 g/10 minutes, particularly preferably 10 to 40 g/10 minutes. The thickness of the adhesive layer laminated onto the reverse side of the paper support is 0.5 to 30 µm, preferably 1 to 20 µm, particularly preferably 2 to 15 µm. The thickness of less than 0.5 µm brings a small adhesive strength due to the occurrence of film rupture of the adhesive layer, a great neck-in, and no improvement in cut properties. The thickness of more than 30 µm brings the degradation of cut properties and the increase of manufacturing cost. The thickness ratio of the adhesive layer to the polyolefin resin layer being a surface layer composing the coextruded multilayer extrusion laminating layer is 1 to 50%, preferably 1.5 to 30%, particularly preferably 2 to 20%, most preferably 2.5 to 15% of the total thickness of both layers. The polyolefin resin layer may contain homopolyethylene resin having a density of less than 0.935 g/cm$^3$ and/or ethylene-α-olefin copolymer resin and/or homopolypropylene resin and/or propylene-α-olefin copolymer resin, various antistatic agent, lubricant, antioxidant, dye, pigment, UV absorber, antiblocking agent, fatty acid metal salt, conductive material, dripproof agent and other known additives each in a necessary amount in addition to the high density homopolyethylene resin having a density of more than 0.940 g/cm$^3$ and/or ethylene-α-olefin copolymer resin.

The adhesive layer is adhered to the paper support, and is composed of less than 5 wt. % of carbon black and 5 to 90 wt. %, preferably 8 to 70 wt. %, particularly preferably 10 to 60 wt. %, of acid-modified adhesive polyolefin resin, in order to ensure adhesive strength and to prevent the occurrence of foaming, film cracking, film rupturing and the like. The content of the acid-modified adhesive polyolefin resin of less than 5 wt. % brings only a small improvement in adhesive strength and in cut properties.

The acid-modified adhesive polyolefin resin is the modified polyolefin resin obtained by the graft-modification of polyolefin resin with an unsaturated carboxylic acid compound.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, nudic acid (end-cis-bicyclo[2,2,1]-hepto-5-en-2,3-dicarboxylic acid), maleic anhydride, itaconic anhydride, citraconic anhydride, aconitic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monomethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide malemide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and nudic acid, and maleic anhydride is particularly preferred. A suitable amount of the unsaturated carboxylic acid compound is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboxylic acid, Suitable peroxides are organic peroxides such as benzoyl peroxide, lauroyl peroxide, dicumyl peroxide, α,α'-bis(t-butylperoxydiisopropyl)-benzene, 2,5-dimethyl-2,5-di(t-butylperoxy)hexane, 2,5-dimethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Particularly preferred peroxides are organic peroxides, such as di-t-butylperoxide, dicumylperoxide, 2,5-dimethyl-2,5-di 2,5-dimethyl-2,5-di(t-butylperoxy)hexyne and 1,3-bis(t-butylperoxyisopropyl)benzene, which have a decomposition temperature between 170° C. and 200° C., and accordingly, the peroxide which adversely affects photographic properties can be decomposed to be harmless by laminating at a resin temperature of higher than 200° C. by extrusion laminating. A suitable amount of the peroxide is 0.005 to 5 parts by weight, preferably 0.01 to 1 part by weight per 100 parts by weight of the polyolefin base resin.

There are commercial acid-modified polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical), "NUC-Ace" (Nippon Unicar), "Ube Bond" (Ube Ind.), "Bodain" (Sumitomo Chemical), "Melcene M" (Toso), "CMPS" (Mitsui Polychemicals), etc.

The unmodified polyolefin resin is polyethylene resin, polypropylene resin, ethylene copolymer resin, polyvinyl chloride resin, or the like.

A suitable content of the acid-modified polyolefin resin is 5 to 90 wt. %, preferably 8 to 70 wt. %, particularly preferably 10 to 60 wt. %. When the content is less than 5 wt. %, the adhesive strength to the paper support is small, and it is liable to be separated. On the other hand, when the content of the acid-modified polyolefin resin is more than 90 wt. %, it adversely affects photographic photosensitive materials, and moreover, washing of an extruder is degraded.

Carbon blacks are divided into gas black, oil furnace black, channel black, anthracene black, acetylene black, Ketjen carbon black, thermal black, lamp black, vegetable black and animal black according to their origin. Among these, oil furnace carbon black is preferable in terms of photographic properties, light-shielding character, cost and improvement of properties. On the other hand, since acetylene black and Ketjen carbon black which is modified by-produced carbon black have an antistatic character, they are also preferable, though they are expensive. They may be blended to the oil furnace black in order to improve its character. As the representative blending methods of carbon black, there are dry coloring, paste color, wet coloring, masterbatch pellets, powder dye, pigment coloring, compound color pellets and the like.

As representative conductive carbon blacks which are preferred, there are "Denka Black" (Denki Kagaku Kyogyo) produced by the acetylene method, "Ketjen Black EC" (Nippon EC KK), "Vulcan XC-72", "Black Pearls #2000", "Vulcan SC", "Vulcan 9", "Vulcan C" (Cabot), "Conductex 975", "Conductex 950", "Conductex SC" (Columbia), "Asahi #95" (Asahi Carbon), "Diablack A" (Mitsubishi Chemical Industries), etc.

The masterbatch method using masterbatch pellets is preferred in view of cost and less contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU NO. 43-10362 discloses another method of making a masterbatch by dispersing the carbon black into polyethylene. The inventor also disclosed a resin composition for color masterbatch (EP 0,277,598A).

Preferable carbon black for the light-shielding paper for packaging photosensitive materials are those having a pH of 5 to 9 and a mean particle size of 10 to 80 mμ, in view of no occurrence of fogging, rare occurrence of sensitivity deviation, great light-shielding ability, rare occurrence of film cracks or pinholes, such as generation of carbon black lumps or fisheyes, in the case of blending into polyolefin resin, such as high density polyethylene resin having a density of more than 0.940 g/cm$^3$ or ethylene copolymer resin, e.g. ethylene-α-olefin copolymer resin, no adverse affect upon photographic properties, the improvement in light-shielding ability and less degradation of physical strength, and the most preferable one is oil furnace carbon black having a pH of 6-9 and a mean particle size of 15 to 50 mμ.

The carbon black content of the adhesive layer is less than 5 wt. %. The content of more than 5 wt. % brings a small adhesive strength to the paper support, degradation of cut properties, and easy peeling off. Moreover, the moisture content of the resin is made less than 600 ppm, and therefore, a hopper dryer heated to more than 60° C., a vented extruder and the like are necessary.

The thickness of the adhesive layer is less than 50%, preferably less than 30%, particularly preferably less than 20% in the ratio to the total thickness of the coextruded multilayer extrusion laminating layer, because of containing acid-modified adhesive polyolefin resin which is expensive, having a great neck-in and adversely affecting photographic properties. As shown by a numerical value, the thickness is preferably less than 30 μm, more preferably less than 20 μm, and most preferably 2.5 to 15 μm. The practical minimum value is about 1.0 μm, and more than 1.5 μm is preferred. On the other hand, in the case that the adhesive layer is a single layer, the thickness is necessary to be more than 8 μm.

The surface layer is composed of more than 3 wt. of carbon black and more than 10 wt. % of ethylene copolymer resin having a MI of more than 2 g/10 minutes.

The carbon black contained in the surface layer is similar to those mentioned in the above adhesive layer. The carbon black content is preferably 4 to 20 wt. %, particularly preferably 5 to 15 wt %. When the content is less than 3 wt. %, light-shielding, antistatic ability and antiblocking ability are insufficient and the paper material cannot be put to practical use as the light-shielding paper for packaging photosensitive materials.

Suitable ethylene copolymer resins are ethylene-vinyl acetate copolymer (EVA) resin, ethylene-propylene copolymer resin, ethylene-1-butene copolymer resin, ethylene-butadiene copolymer resin, ethylene-vinyl chloride copolymer resin, ethylene-methylmethacrylate copolymer resin, ethylene acrylate copolymer resin (ethylene-methyl acrylate copolymer (EMA) resin, ethylene-ethyl acrylate copolymer (EEA) resin), ethylene-acrylonitrile copolymer resin, ethylene-acrylic acid copolymer (EAA) resin, inomer resin (copolymer of ethylene and unsaturated acid crosslinked using metal such as zinc), ethylene-α-olefin copolymer (L-LDPE) resin, ethylene-propylene-butene-1 ternary copolymer resin, polyolefin resin elastomer, and the like. Among the above ethylene copolymer resins, L-LDPE resin and EEA resin are preferred, because they are inexpensive, excellent in heat stability and coextruding extrusion laminating properties, and they do not affect adversely photographic photosensitive materials.

As the polymerization process of L-LDPE (linear low density polyethylene) resin, there are the vapor process, the solution process and the liquid slurry process using a medium, low pressure apparatus and the ion polymerization process using an apparatus for the high pressure modified method.

The L-LDPE resin is called a third polyethylene resin, and it is a low cost high strength resin, having the advantages of low, medium and high density polyethylene resin, which meets the requirements, i.e. resource conservation and energy conservation, of the times. The L-LDPE resin is a copolymer of ethylene and α-olefin, and it has a linear structure having short branches. The ethylene content is 85 to 99.5 mol. %, and the number of carbon atoms of the α-olefin is 3 to 13. Preferable α-olefins have a number of carbon atoms of 4 to 10, and examples of the α-olefin are butene-1, 4-methylpentene-1, hexene-1, heptene-1 and octene-1. The density is usually in the range of 0.87 to 0.95 g/cm$^3$. Examples of commercial L-LDPE resin are "G-Resin" and "TUFLIN" and "NUC-FLX" (UCC), "NUC Polyethylene-LL" and "TUFTHENE" (Nippon Unicar), "Excelene VL" (Sumitomo Chemical), "Idemitsu Polyethylene-L" (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Stamilex" (DSM), and the like. Preferable L-LDPE resins in view of physical strength and heat seal strength are copolymers of ethylene and α-olefin, of which the number of carbon atoms is 6 to 8, having an ethylene content of 90 to 99.5 mol. %, an α-olefin content of 0.5 to 10 mol. %, a melt index (MI) of 0.8 to 30 g/10 minutes (ASTM D-1238) and a density of 0.870 to 0.940 g/cm$^3$ (ASTM D-1505) manufactured by liquid process or vapor process. Very low density L-LDPE resins having a density of 0.870 to 0.910 g/cm$^3$ are also preferred, particularly for the surface layer because film rupture, film cracks or pinholes do not occur, even if the layer is thinned with an increase in the light-shielding material content.

The EEA resin is not restricted, and commercial EEA resins have, for example, a comonomer content of 7 to 41%, a MI of 1.5 to 1500 g/10 minutes (ASTM D-1238), a density of 0.93 to 0.95 g/cm$^3$ (ASTM D-1505) a brittle temperature of −40° C. to less than −75° C. (ASTM D-746) and a tensile strength of 14 to 160 kg/cm$^2$ (ASTM D-638).

The ethylene copolymer resin is necessary to have a MI of more than 2 g/10 minutes. The MI of less than 2 g/10 minutes brings a large neck in, a small adhesive strength to the paper support and a degraded melt ductility (draw down ability) resulting in a difficulty to put to practical use. Preferable MI is 2 to 20 g/10 minutes, and 3 to 12 g/10 minutes is particularly preferred. The density is usually 0.90 to 0.94 g/cm$^3$, preferably 0.91 to 0.93 g/cm$^3$, particularly preferably 0.915 to 0.927 g/cm$^3$. The ethylene copolymer resin content is more than 10 wt. %. When the content is less than 10 wt. %, film rupture, pinholes and the like tend to occur.

The thickness of the surface layer is preferably more than 10 μm, more preferably more than 15 μm, most preferably more than 20 μm, in view of ensuring light-shielding and preventing the occurrence of film rupture and pinholes.

The surface layer is preferably formed by extruding under conditions at a resin temperature of lower than 330° C., preferably lower than 315° C., particularly preferably lower than 300° C. at a moisture content of less than 600 ppm, preferably less than 500 ppm, particularly preferably less than 250 ppm made by heating for a long period using a dryer, preferably a vacuum dryer, by using a heated hopper dryer or by using a vented extruder, in order to prevent the occurrence of troubles, such as foaming, film cracks or pinholes. When the moisture content exceeds 600 ppm, foaming, film cracks and pinholes tend to occur. When the resin temperature is made higher than 330° C., not only foaming, film cracks and pinholes frequently occur due to expansion of water in the resin, but also lumps and microgrits frequently occur due to the thermal degradation of resin. Die lip fouling tends to occur, and streak unevenness occurs due to the uneven coating amount.

Various conductive materials may be blended into the paper support, the adhesive layer and the surface layer of the invention in order to prevent the occurrence of static marks on photosensitive materials and the like. Examples of the conductive materials usable in the invention are nonionic surfactants (representative component: polyoxyethylene glycol compound), anionic surfactants (representative component: polyoxyethylene glycol compound), cationic surfactants (representative component: quaternary ammonium salt), amphoretic surfactants, alkylamine derivatives, fatty acid derivatives, various lubricants, carbon black, graphite, metal surface coating pigments, metal powders, metal flakes, carbon fibers, metal fibers, whiskers (potassium titanate, aluminum nitride, alumina, etc.) and other conductive inorganic compounds.

Representative nonionic surfactants are polyethylene glycol fatty esters and phosphate esters, representative cationic surfactants are primary amine salts, tertiary amine salts, quaternary ammonium salts and pyridine derivatives, and representative amphoteric surfactants are carboxylic acid derivatives, imidazoline derivatives and betaine derivatives.

Particularly preferable conductive inorganic compounds are salts of at least one element selected from lithium, sodium, potassium, magnesium, calcium, lead, iron, copper, zinc, aluminum, tin, strontium and manganese. Among the salts, particularly preferred ones, in view of effect and economy, are hydrochloride salts, such as sodium chloride, potassium chloride, magnesium chloride, calcium chloride, iron chloride and copper chloride, nitrate salts, such as potassium nitrate, magnesium nitrate and zinc nitrate, sulfate salts, such as sodium sulfate, aluminum sulfate, magnesium sulfate and iron sulfate, phosphate salts, such as potassium hydrogen phosphate and sodium phosphate, borate salts, such as potassium borate, bromides, such as sodium bromide and lithium bromide. The above compounds may have water of crystallization. The inorganic compound may be incorporated by any means, and representative method is by immersing paper into an aqueous solution of the ingoranic compound during papermaking. The amount of the inorganic compound is preferably in the range of 0.1 to 20 mg/100 cm$^2$. In the case of less than 0.1 mg/100 cm$^2$, antistatic ability is insufficient, and in the case of more than 20 mg/100 cm$^2$, they adversely affect photographic film, such as fogging.

Lubricant may be blended into the paper support, the adhesive layer and the surface layer of the invention in order to prevent static electrification, to improve slipping character between photosensitive material, to prevent abrasion and the like. A suitable amount is 0.01 to 5.0 wt. %. In the extrusion coating method, it is said that lubricant cannot be used because of decreasing heat seal strength and the adhesive strength to the support. However, in the invention, the above problems are solved by blending 5 to 90 wt. % of acid-modified adhesive polyolefin resin into the adhesive layer and more than 10 wt. % of ethylene-α-olefin copolymer resin into the surface layer, and extrusion coating properties are improved by blending lubricant. It is particularly effective for increasing coating speed. Suitable lubricants, which do not affect photosensitive materials adversely, are described below.

Oleic acid amide lubricants:
"ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" ( Nippon Oil and Fats Co., Ltd,), etc.

Erucic acid amide lubricants:
"ALFLOW P-10" (Nippon Oil and Fats Co., Ltd.), etc.

Stearic acid amide lubricants:
"ALFLOW S-10" (Nippon Oil and Fats Co., Ltd.), "NEWTRON 2" (Nippon Fine Chemical Co., Ltd.), "DIAMID 200" (Nippom Kasei Chemical Co., Ltd.), etc.

Bis fatty acid amide lubricants:
"BISAMIDE" (Nippo Kagaku K.K.). "DIAMID-200 BIS" (Nippon Kasei Chemical Co., Ltd.), "ARMOWAX-EBS" (Lion Akzo Co., Ltd.), etc.

Silicone lubricants:
dimethylpolysiloxanes, etc. (Sinetsu Chemical Co., Ltd., Toray Silicone Co., Ltd.), etc.

Alkylamine lubricants:
"ELECTROSTRIPPER TS-2" (Kao Corp.). etc.

Hydrocarbon lubricants:
liquid paraffin, natural paraffin, microwax, synthetic paraffin, polyethylene wax, polypropylene wax, chlorinated hydrocarbon, fluorocarbon, etc.

Fatty acid lubricants:
higher fatty acids preferably more than $C_{12}$, hydroxy fatty acids, etc.

Ester lubricants:
fatty acid lower alcohol esters, fatty acid polyol esters, fatty acid polyglycol esters, fatty acid fatty alcohol esters, etc.

Alcohol lubricants:
polyols, polyglycols, polyglycerols, etc.

Metallic soap:
metal salts such as Li, Mg, Ca, Sr, Ba, Zn, Cd, Al, Sn, Pb salts of higher fatty acids such as lauric acid, stearic acid, ricinoleic acid, 2-ethylhexoic acid, naphthenic acid, oleic acid, etc. The melting point is more than 70° C., preferably more than 90° C., particularly preferably more than 100° C.

In addition, 0.01 to 10 wt. %, preferably 0.05 to 5 wt. % of hydrotalcite (including compounds) may be added for the purpose of rendering harmless the halogen compounds which adversely affect photographic properties of photographic photosensitive materials.

Moreover, it is preferable to blend a dripproofing agent and a nucleating agent according to the object of the invention. The dripproofing agent includes diglycerine monostearate ester, polyglycerine monopalmitate ester, sorbitan monolaurate ester, sorbitan monoerucate, polyoxyethylene sorbitan fatty acid ester, stearic acid monoglyceride, palmitate monoglyceride, oleate monoglyceride, laurate monoglyceride, polyoxyethylene nonylphenyl ether, sorbitan sesquipalmitate, diglycerine sesquioleate, sorbitol fatty acid ester, sorbitol fatty acid dibasic acid ester, diglycerine fatty acid dibasic acid ester, glycerine fatty acid dibasic acid ester, sorbitan fatty acid dibasic acid ester, sorbitan palmitate, sorbitan stearate, sorbitan palmitate propylene oxide 3 moles adduct, sorbitan palmitate propylene oxide 2 moles adduct, sorbitol stearate, sorbitol stearate ethylene oxide 3 moles adduct, diglycerine palmitate, glycerine palmitate, glycerine palmitate ethylene oxide 2 moles adduct, etc. A suitable content of the dripproofing agent is 0.01 to 5 wt. %, preferably 0.1 to 3 wt. %, more preferably 0.3 to 2 wt. %. When the content is less than 0.01 wt. %, the blending effect does not appear. When the content is more than 5 wt. %, the effect by the increase of blending amount is very small. Moreover, according to the kind of dripproofing agent, stable injection amount cannot be ensured by screw slip of thermoplastic resin, or bleeding out of the molded article gradually increases to degrade the quality by greasiness or adhesion of dust.

The nucleating agent improves crystallization speed, film forming speed, rigidity, and physical strength.

The organic nucleating agent includes carboxylic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3-benzylidenesorbitol, 1,3,2,4-dibenzylidenesorbitol, the di-substituted benzylidene-sorbitol represented by the following formula;

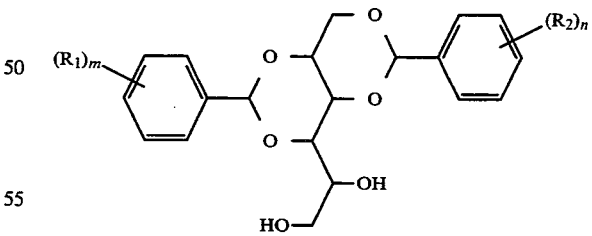

In the formula, $R_1$ and $R_2$ indicate an alkyl group or an alkoxy group having a number of carbon atoms of 1 to 8 or a halogen, and m and n are 0 to 3 and $m+n \geq 1$. such as di-(o-methylbenzylidene)sorbitol,
o-methylbenzylidene-p-methylbenzylidene sorbitol,
di-(m-methylbenzylidene)sorbitol,
m-methylbenzylidene-o-methylbenzylidene sorbitol,
di-(p-methylbenzylidene)sorbitol,
m-methylbenzylidene-p-methylbenzylidene sorbitol,
1.3-heptanylidenesorbitol, 1.3,2.4-diheptanylidenesorbitol, 1.3,2.4-di(3-nonyl-3-pentenylidene)sorbitol,
1.3-cyclohexanecarbylidenesorbitol,
1.3,2.4-dicyclohexanecarbylidenesorbitol,
1.3,2.4-di(p-methylcyclohexanecarbylidene)sorbitol,
1.3-benzylidenesorbitol, 1.3,2.4-dibenzylidene-D-sorbitol,
1.3,2.4-di(m-methylbenzylidene)sorbitol,
1.3,2.4-di(p-methylbenzylidene)sorbitol,
1.3,2.4-di(p-hexylbenzylidene)sorbitol,
1.3,2.4-di(1-naphthalenecarbylidene)sorbitol,
1.3,2.4-di(phenylacetylidene)sorbitol,
1.3,2.4-di(methylbenzylidene)sorbitol,
1.3,2.4-di(ethylbenzylidene)sorbitol,
1.3,2.4-di(propylbenzylidene)sorbitol,
1.3,2.4-di(methoxybenzylidene)sorbitol,
1.3,2.4-di(ethoxybenzylidene)sorbitol,
1.3.2.4-di(P-methylbenzylidene)sorbitol,
1.3.2.4-di(P-chlorbenzylidene)sorbitol,
1.3.2.4-di(P-methoxybenzylidene)sorbitol,
1.3.2.4-di(alkylbenzylidene)sorbitol,
1.3.2.4-bis(methylbenzylidene)sorbitol, aluminum benzoate, etc., metal salts, such as calcium salt and magnesium salt, of stearyl lactic acid, the compounds, such as N-(2-hydroxyethyl)-stearylamine, represented by the following formula;

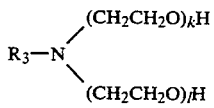

In the formula, $R_3$ indicates an alkyl group having a number of carbon atoms of 8 to 30, and k and l are 0 to 10 and $k+l \geq 1$.
metal salts, such as lithium salt, sodium salt, potassium salt, calcium salt and magnesium salt, of 1,2-dihydroxystearic acid, stearyl alcohol, lauryl alcohol, sodium benzoate, benzoic acid, and sebacic acid.

Inorganic nucleating agents includes an alkali metal hydroxide such as lithium hydroxide, sodium hydroxide and potassium hydroxide, an alkali metal oxide, such as sodium oxide, an alkali metal carbonate, such as lithium carbonate, sodium carbonate, potassium carbonate, sodium hydrogencarbonate and potassium hydrogencarbonate, an alkaline earth hydroxide, such as calcium hydroxide, magnesium hydroxide and barium hydroxide, an alkaline earth oxide, such as calcium oxide, and an alkaline earth carbonate, such as calcium carbonate.

The nucleating agent is not limited to the above compounds, and any known nucleating agent may be employed. Moreover, two or more nucleating agents may be used simultaneously.

Preferable nucleating agents are dibenzylidene sorbitol compounds and aluminum benzoate because of not affecting photographic film adversely but exhibiting a high nucleating action.

The following di-substituted benzylidene sorbitol compounds are particularly preferable in order to improve physical strength, rigidity, film forming speed and decrease molding troubles of polyolefin resin (high density homopolyethylene resin having a density of more than 0.940 g/cm³, ethylene-α-olefin copolymer resin), and odor and bleeding out.

The dibenzylidene sorbitol composition contains solid powder of the dibenzylidene sorbitol derivative have the general formula (I),

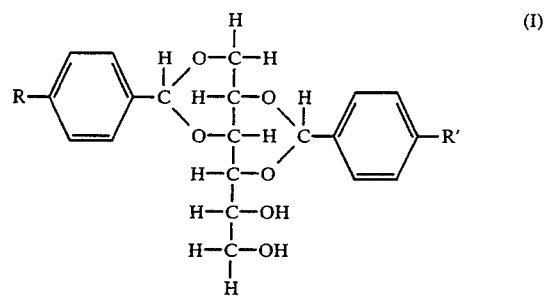

In the formula, R and R' separately represents an atom or group selected from chlorine atom, methyl group and ethyl group,
and a higher fatty acid having the general formula (II),

$$CH_3(CH_2)_nCOOH \quad (II)$$

In the formula, n represents a number of 14–30, preferably 18–27, most preferably 20–25
as the essential components, and the surface of the solid powder of the dibenzylidene sorbitol derivative is coated by the higher fatty acid.

Preferable dibenzylidene sorbitol derivatives of the general formula (I) include 1,3.2,4-di-p-methylbenzylidene sorbitol, 1,3.2,4-di-p-ethylbenzylidene sorbitol, 1,3-p-methylbenzylidene-2,4-p-chlorobenzylidene sorbitol, 1,3-p-methylbenzylidene-2,4-p-ethylbenzylidene sorbitol and 1,3-p-chlorobenzylidene-2,4-p-methylbenzylidene sorbitol.

Particularly preferable dibenzylidene sorbitol derivatives of the general formula (I) have a methyl group or chlorine atom as R and R' separately, and include 1,3.2,4-di-p-methylbenzylidene sorbitol, 1,3-p-methylbenzylidene-2,4-p-chlorobenzylidene sorbitol and 1,3-p-chlorobenzylidene-2,4-p-methylbenzylidene sorbitol.

Preferable higher fatty acids of the general formula (II) are behenic acid, stearic acid and palmitic acid. Behenic acid is the most preferable, and stearic acid takes second place.

The particle size of the solid powder of the dibenzylidene sorbitol derivative is not particularly limited, but those having a particle size distribution of 30 to 100 mesh are preferred.

A suitable blending ratio is 95 to 50 parts, preferably 90 to 50 parts, by weight of the dibenzylidene sorbitol derivative to 5 to 50 parts, preferably 10 to 50 parts, by weight of the higher fatty acid in the sum of 100 parts by weight.

The above preferable organic nucleating agent composition can be prepared by adding solid powder of the dibenzylidene sorbitol derivative to an aqueous emulsion containing the higher fatty acid in the above ratio, stirring to form a coating layer of the higher fatty acid on the surface of the solid powder of the dibenzylidene sorbitol derivative, filtering out the dibenzylidene sorbitol derivative powder having the higher fatty acid coating, washing and drying. The aqueous emulsion of the higher fatty acid used in the above method can be prepared by dispersing an organic solvent solution containing 5 to 50 wt. %, preferably 10 to 50 wt. % of the higher fatty acid into water using a small amount of surfactant, e.g. 1 to 10 parts, preferably 2 to 5 parts, by weight of the surfactant per 100 parts by weight of the higher fatty acid. The presence of the higher fatty acid coating formed on the surface of the solid powder of the dibenzylidene sorbitol derivative can be confirmed by coloring the coating with a dye and then observing.

The blending amount of the preferable organic nucleating agent composition is 0.01 to 2 parts, preferably 0.05 to 1 part by weight of the dibenzylidene sorbitol derivative per 100 parts by weight of polyolefin resin in the state coated with the higher fatty acid. The organic nucleating agent composition can be blended into the polyolefin resin by an arbitrary known mixing means. The preferable organic nucleating agent composition is optionally used as a masterbatch of the polyolefin resin containing the composition in a high content.

In the preferable organic nucleating agent composition, it is important to coat the surface of the solid particles of the dibenzylidene sorbitol derivative with the higher fatty acid, and when the dibenzylidene sorbitol derivative and the higher fatty acid are merely blended with the polyolefin resin, the aforementioned effect cannot be obtained. Moreover, unless a heat history of more than 180° C., preferably more than 190° C., particularly preferably more than 200° C. is added, the aforementioned effect cannot be obtained.

The heat history is sufficient by once, and for example, the aforementioned effect can be achieved by blending 0.01 to 2 wt. % of the di-substituted benzylidene sorbitol composition with the polyolefin resin and heating to more than 180° C., preferably more than 190° C., particularly preferably more than 200° C. to be pelletized. Even when the pellets are extruded at lower than 180° C., the effect can be obtained. However, by rendering the extrusion temperature higher than 180° C., the film layer extruded is made very excellent in physical properties and rigidity, has a highly glossy surface and rare occurrence of wrinkling and streaks.

The preferable organic nucleating agent composition does not degrade various properties, such as physical strength, resistance to bleeding out and rigidity, by blending with the polyolefin resin, but occasionally improves these properties. The composition is excellent in that it does exhibit an odor, and improves resistance to wrinkling and streaks, film moldability to elevate film forming speed and decreases molding troubles. That is, by blending the above di-substituted benzylidene sorbitol composition, physical strength, rigidity, resistance to bleeding out, absence of odor, film moldability, and resistance to abrasion are improved.

The reason, why the preferable organic nucleating agent composition exhibits the above effects, is not clear. However, in the conventional benzylidene sorbitol compound, benzaldehyde and benzaldehyde derivatives such as p-substituted benzaldehyde which is a raw material of the dibenzylidene sorbitol derivative of the invention have odor, and it can be considered, that a minor amount of them remains unavoidably after purification to evolve odor, and a small amount of the dibenzylidene sorbitol (derivative) decomposes during extruding to evolve odor. In the preferable organic nucleating agent composition, odor presumed due to the raw benzaldehydes or the benzaldehyde produced by decomposition is sharply reduced by satisfying two requirements that solid particles of a specific dibenzylidene sorbitol derivative of the general formula (I) are used and that the particles are coated with a specific higher fatty acid of the general formula (II). Moreover, the aforementioned various properties, such as rigidity and physical strength are made very excellent.

The organic nucleating agent may be used alone, or two or more organic nucleating agents may be combined. The organic nucleating agent may be combined with an inorganic nucleating agent. The surface of the organic nucleating agent may be coated with various lubricants, such as fatty acid, fatty acid compound or silicone, coupling agent, plasticizer, dispersing agent, such as surfactant, wetting agent or the like.

The content of the nucleating agent is 0.01 to 2 wt. %, preferably 0.05 to 1 wt. %, particularly preferably 0.07 to 0.5 wt. %. When the content is less than 0.01 wt. %, the effect of the nucleating agent is insufficient. While, when the nucleating agent is added beyond 2 wt. %, the effect of the excess amount of the nucleating agent is minor. According to the kind of the nucleating agent, it adversely affects photographic photosensitive materials, adheres to a mold, bleeds out, decreases dropping strength, or the like.

As the method of blending the nucleating agent, there are the compound method, the dry blending method, the masterbatch method, and the like, and the masterbatch method is preferred. Since the nucleating agent is bulky and tends to fly away, to blend a small amout of dispersing agent or wetting agent is preferred. Suitable dispersing agents include various lubricants, various low molecular weight polyolefin resins having a molecular weight of 500 to 10,000, carboxylic acid anhydrides, higher fatty acids, etc., and lubricants such as various fatty acid metal salts, various silicones and oleic amide are particularly preferred. As the wetting agent, plasticizers such as DOP and DHP can be used.

It is also preferred to prevent the bleeding out by coating or blending a fatty acid or a fatty acid compound, such as a higher fatty acid, a fatty acid amide or a fatty acid metal salt onto or with the organic nucleating agent. Furthermore, the blending effect of the nucleating agent is improved by using a form of pellets formed by blending with a polyolefin resin having a heat history at higher than 180° C., preferably higher than 190° C., particularly preferably higher than 200° C. By blending these additives, white powder generation caused by abrasion can be decreased by increasing rigidity, and white powder generation caused by crystallization or bleeding out of the organic nucleating agent can also be decreased. Moreover, uncomfortable odor of the organic nucleating agent is prevented, and antistatic ability and antiblocking ability are improved. In this case, it is preferred to blend the aforementioned antioxidant in order to prevent degradation, oxidation decomposition or coloring of the dispersing agent and various thermoplastic resins.

Light-shielding material may be added in a necessary amount to the paper support, the adhesive layer, the surface layer and a thermoplastic resin layer according to the required properties, such as to ensure light-shielding, to improve antistatic ability, to improve printability, to improve discrimination under safety light, to improve shielding ability, to improve resolving power (sharpness), to improve cutting properties (cut properties) and the like.

Representative examples of the light-shielding material are shown below.

Inorganic Compounds:

Oxides . . . Silica, diatomaceous earth, alumina, titanium oxide, iron oxide, zinc oxide, magnesium oxide, antimony oxide, barium ferrite, strontium ferrite, berylium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montomorillonite, bentonite, etc.

Carbons . . . carbon black, graphite, carbon fiber, carbon hollow bead, etc.

Others . . . iron powder, copper powder, lead powder, tin powder, stainless steel powder, pearl pigment, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc.

Organic Compounds:

wood flour such as pine, oak and sawdust, husk fiber such as almond, peanut and chaff, colored various fibers such as cotton, jute, paper piece, cellophane piece, nylon fiber, polypropylene fiber, various starch (containing modified starch, surface-treated starch, etc.), aromatic polyamide fiber, etc.

Among them, in the case of the layer on the photosensitive layer side, inorganic compounds rendering opaque are preferable, and carbon black, titanium nitride and graphite which are light-absorptive light-shielding material are particularly preferred, since they are excellent in light-shielding ability, heat resistance and light resistance and are relatively inactive materials. In the case of the printing surface side, light-reflective white pigment and yellow pigment are preferable because of the improvement in printability, discrimination of obversereverse side under a safety light, appearance, and the like, and include titanium oxide (anatase, rutile), zinc white, calcium carbonate, lead white, titanium yellow, oil yellow, etc.

Among the other inorganic compounds, preferable ones are those having a refraction index measured by the Larsen's oil immersion method of more then 1.51 which is greater than the refractive index of thermoplastic resin which is about 1.4 to 1.5. Such an inorganic compound includes inorganic pigments, various metal powders, metal flakes, metal pastes, metal fibers, and carbon fiber, having a reflactive index of more than 1.51. Representative examples are titanium oxide in rutile type (2.76), titanium oxide in anatase type (2.52), zinc oxide (2.37), antimony oxide (2.35), lead white (2.09), zinc white (2.02), lithopone (1.84), carbon black (1.61), baryta powder (1.64), barium sulfate (1.64), calcium carbonate (1.58), talc (1.58), calcium sulfate (1.56), silicic anhydride (1.55), silica powder (1.54), magnesium hydroxide (1.54), basic magnesium carbonate (1.52), alumina (1.50), and the like. The number in parenthesis indicates refractive index. Particularly preferable inorganic compounds are those having a refractive index of not less than 1.56, and those having a refractive index of not less than 1.61 are the most preferable. On the other hand, since calcium silicate (1.46), diatomaseous earth (1.45), hydrous silicate (1.44) and the like have a refractive index of less than 1.50, they are unsuitable. As the representative examples of metal powder, including metal paste, there are copper powder, stainless steel powder, iron powder, silver powder, tin powder, zinc powder, steel powder, etc.

Suitable carbon black is similar to aforementioned ones. In addition, particularly preferable carbon balck is oil furnace carbon black having a pH of 6.0 to 9.0, a mean particle size of 10 to 120 m$\mu$, preferably 15 to 100 m$\mu$, particularly preferably 20 to 80 m$\mu$, a volatile components content of less than 2.0%, and an oil absorption value of more than 50 ml/100 g, preferably more than 70 ml/100 g, particularly preferably more than 100 ml/100 g, in view of no occurrence of fogging and sensitivity deviation, a great light-shielding ability, rare occurrence of pinholes in the film, such as the occurrence of carbon black lumps and fisheyes in the case of blending into L-LDPE resin film, the improvement in dispersibility and less reduction of physical properties.

It is also preferable to blend a necessary amount of various antioxidant into the adhesive layer, the surface layer and a thermoplastic resin layer in order to prevent the degradation of properties, coloring trouble and generation lumps and microgrits caused by the thermal decomposition of resin and to prevent the production of substances adversely affecting photographic photosensitive materials by thermal degradation, according to the required properties.

Since the paper material of the invention is used for photographic photosensitive materials of which the quality (photographic properties) is adversely affected by very many materials in a very small amount compared with other commercial goods, it is preferable to blend a necessary amount of a material which prevents the generation of a substance affecting adversely photographic properties, such as the above antioxidant, or a material which renders a substance affecting adversely photographic properties harmless by adsorption or reaction, such as activated carbon, graphite or zeolite. For example, antifoam which does not contain silicone oil or propylene oxide is used for the paper support. The moisture content of the paper is rendered 2 to 8% according to JIS P-8203. A neutral paper is used having a pH of 6 to 9 measure by cool water extracting method according to JIS P-8133. Pulp is blended with 0.01 to 3% by dry weight of an urea compound (including urea) having a molecular weight of les than 150, and blended with 0.0002 to 0.2% by dry weight of a water-soluble iodine compound. And, the paper support containing 30 to 70 wt. % of wood pulp produced by the oxygen pulping method. The paper support contains more than 30%, preferably more than 40%, particularly preferably more than 50% of hardwood pulp, and has a surface smoothness of more than 70 seconds, preferable more than 90 second, particularly preferably more than 120 seconds, measured by a Bekk smoothness tester according to JIS P-8119 and a density of 0.7 to 1.3 g/cm$^3$, preferably 0.9 to 1.2 g/cm$^3$ according to JIS P-8118, in order to prevent adverse affects, such as abrasion or pressure marks, upon photosensitive materials caused by the irregularity of the surface of the paper support, to remove the space between photosensitive material, and to improved light-shielding and moisture-proofness.

Some examples of the paper support are show below which is excellent in smoothness and cutability (cut properties).

(1) The paper support produced by fusing polyolefin resin synthetic pulp by heat-treating a paper-formed substrate or a blend thereof with wood pulp at 110° to 200° C. as the temperature of the substrate. It contains more than 10 wt. % of the synthetic pulp. Representative examples of the synthetic pulp are composed of a synthetic polymer of ethylene, propylene, isobutylene or the like, a blend thereof or a copolymer of them with other monomer and formed into pulp form (e.g. Japanese Patent KOKOKU No. 40-28125, Japanese Patent KOKAI No. 46-3906). It resists the separation between paper layers, has a great adhesive strength to the extrusion laminating layer, and is excellent in cut properties, compared with a conventional paper support composed of wood pulp.

(2) The paper support having a surface smoothness of more than 70 seconds, preferably more than 90 seconds, particularly preferably more than 120 seconds measured by a Bekk smoothness tester according to the paper smoothness measuring method of JIS P-8119 or TAPPI Standard T479. The paper support is made of wood pulp, and has a density of 0.7 to 1.3 g/cm$^3$, preferably more than 0.8 g/cm$^3$, particularly preferably 0.8 to 1.2 g/cm$^3$, according to JIS P-8118. The paper support can be produced by using hardwood pulp of which the fiber is fine and short, by dispersing pulp fibers well on a papermaking machine to prepare a paper having a good formation, by flattening the irregularity of the paper surface mechanically by increasing the calendering pressure, by combinging kraft process hardwood pult (LBKP), sulfite process hardwood pulp (LBSP), kraft process softwood pulp (NBKP), synthetic pulp, eucalyptus, pult regenerated pulp and the like in view of fiber length, fiber thickness, kind of sizing agent and blending amount, or by increasing the moisture content of the paper support to be pressed by calendering, or by combining two or more of the above means. The paper support can be produced by increasing the calendering pressure to more than 60 kg/cm, preferably more than 80 kg/cm, most preferably more than 120 kg/cm.

(3) The paper support containing more than 0.5 g/m$^2$, preferably more than 1 g/m$^2$ of polyvinyl alcohol and 1 to 300 parts by weight of borax per 100 parts by weight of polyvinyl alcohol (by tablet sizing, size press, spray). Cut properties (cut end) is excellent. The polyvinyl alcohol has a saponification degree of 71 to 100 mol. %, preferably 87 to 100 mol. %, and a polymerization degree of 400 to 2400, preferably 600 to 2300 (gas barrier and photographic properties are improved).

(4) The paper support having a Bekk smoothness of preferably more than 90 seconds, particularly preferably more than 120 seconds, a density of 0.7 to 1.3 g/cm$^3$, preferably 0.8 to 1.2 g/cm$^3$ and a thickness of 30 to 330 μm by multistage stretch pressing wet paper having a moisture content of 30 to 65% and a temperature of 30° to 90° C. at a line pressure of 20 to 80 kg/cm at the drying part of papermaking machine (smoothness is improved).

(5) When the paper support contains more than 30 wt. %, preferably more than 40 wt. %, particularly preferably more than 50 wt. %, most preferably more than 60 wt. % of LBKP, the paper support is excellent in smoothness of more than 100 seconds, in cut properties and in flexibility.

(6) The paper support using the wood pulp having a mean fiber length of 0.4 to 0.9 mm, a mean fiber width of more than 10 μm and a mean fiber thickness of less than 5 μm (smoothness is improved).

(7) The paper support containing more than 30% of bleached hardwood pulp (LBSP) produced by the sulfite process at the maximum cooking temperature of higher than 130° C., and having a void quantity of pores (having a pore size of less than 0.4 μm) of more than 0.04 ml/g measured by the mercury intrusion method after calendering and a density of more than 0.95 g/cm$^3$ (smoothness is improved).

(8) When the paper support is formed of a mixed cooking pulp produced by cooking a mixture of 5 to 40% by dry weight of softwood and 95 to 60% by dry weight of hardwood mixed in a wood chip stage, cut properties are excellent.

Besides, fogging or abrasion caused by the formation of aggregates (microgrits) can be prevented by coating the surface of the light-shielding material blended into resin, particularly carbon black which is a representative example of light-absorptive light-shielding material, titanium dioxide, barium sulfate, calcium carbonate, zinc oxide and the like which are representative examples of light-reflective light-shielding material, having a particle size of less than 1 μm and being aggregated easily, with various coupling agents, various lubricants, such as fatty acid metal salt, fatty amide or wax, surfactants, dimethylpolysiloxane, divalent to quadravalent alcohol, silica or the like.

The surface layer of the invention may be provided with an undercoat layer, such as a hydrophilic polymer (gelatin, polyvinyl alcohol, alternative copolymer of maleic anhydride and vinyl compound) layer of pH 6-9, a polyvinylidene resin layer or the like.

Moreover, it is preferable that the surface layer, at least the surface layer on the photographic photosensitive material side, is a polyamide resin layer, a polyester resin layer, an EVOH (ethylene-vinyl acetate copolymer saponified) resin layer such as having an ethylene content of 10 to 50 mol. % and a saponification value of more than 85 mol. %, or ethylene-vinyl alcohol copolymer resin layer in order to shield gases in the paper support which adversely affect photographic properties.

In order to improve the adhesive strength between the paper support and the adhesive layer, the surface of the paper support or the adhesive layer may be treated with a physical treatment. Some of the physical treatment are shown below. Two or more physical treatments may be combined, or anchoring (AC) may be combined. These treatments are effective also for the improvement in the adhesive strength between the surface layer and print, the surface layer and the undercoat layer, the surface layer and a photographic emulsion layer. The most preferable treatment is corona discharge because of relatively inexpensive equipment cost, easy handling and a great surface activation.

Flame treatment . . . Running cost is high, and there is the danger of fire.

Plasma treatment . . . Argon gas is converted into plasma, and joining surface is treated with the plasma. The treating strength is several times as much as corona discharge treatment, but the equipment cost for plasma treatment is several tenths higher than corona discharge treatment.

Corona discharge treatment . . . This inexpensive treatment is widely utilized, and the treated effect is large.

Sandblasting treatment . . . Sand such as silica sand is blasted at a high pressure to the joining surface, and the surface is made rough.

Chemical agent treatment . . . Treated with a dichromate solution or etc.

Ozone treatment . . . Treated in a box filled with ozone gas. Even though the resin temperature of extrusion laminating is lowered, the adhesive strength is still improved.

Preheat treatment . . . The paper support to be conducted with extrusion laminating a thermoplastic resin is preheated at 80° to 200° C. with a heat drum, hot air or etc.

Ultraviolet irradiation
High-frequency heating
Dielectric heating
Microwave heating, etc.

The adhesive strength of the adhesive layer may also be improved by coating an anchor coating agent.

Anchor coating agent is a generic name of adhesive promoter and cross-linking agent used in the field of laminating, and it is also called a primer. Representative examples of the anchor coating agent are as follows:

(1) Organic titanate anchor coating agent

Tetrapropyl titanate or tetraisobutyl titanate is used as the principal constituent, and tetrastearyl titanate is added as a hydrolysis-adjusting agent.

(2) Polyethyleneimine anchor coating agent

A relatively high polymer of ethyleneimine $\text{-(CH}_2\text{-CH}_2\text{-NH)}_{\overline{n}}$ is used. This agent is particularly preferable because its handling is easy and its pot life is long.

(3) Polyisocyanate anchor coating agent

One-component type; Polymer having isocyanate group alone

Two-component type; Combination of a polymer having isocyanate group and a polyester having OH group A chemical reaction such as a crosslinking reaction occurs in both types, and an adhesive effect appears. Pot life is short, and this coating agent is expensive.

(4) Polyester and urethane anchor coating agent

Saturated polyester resin or urethane resin is dissolved in a solvent such as ethyl acetate or toluene.

(5) Polyolefin anchor coating agent (6) Polybutadiene anchor coating agent (7) Coating an aqueous composition containing a polymer aqueous dispersion wherein a copolymer composed of at least ethylene and acrylic acid (or methacrylic acid) is dispersed in a cationic resin aqueous solution.

The anchor coat layer is preferably made extremely thin. The coating method may be gravure roll coating, kiss roll coating, curtain coating, bar coating, reverse roll coating, direct roll coating, air knife coating or the like.

The aforementioned paper material for photosensitive materials can be used for the light-shielding papers wound together with a rolled photosensitive material, light-shielding bags for photosensitive materials, light-shielding papers used for an instant film in a pillar type, light-shielding envelopes for a cut negative film or a reversal film for photographing for daylight loading, leader papers for a magazineless package for light room loading, and the like.

The paper material for photosensitive materials of the invention is also composed of a paper support having a density of more than 0.80 g/cm$^3$, a coextruded multilayer extrusion laminating layer laminated onto one side of the paper support, and a polyolefin resin extrusion laminating layer containing 5 to 95 wt. % in the total content of either or both of high density homopolyethylene resin having a density of more than 0.940 g/cm$^3$ and ethylene-α-olefin copolymer resin laminated onto the other side, the coextruded multilayer extrusion laminating layer comprising an adhesive layer comprising 5 to 90 wt. % of acid-modified adhesive polyolefin resin and a polyolefin resin surface layer containing more than 3 wt. % of light-reflective light-shielding material. The paper material is particularly preferable as the support for a photographic printing paper.

The paper support used as the support for a photographic printing paper is similar to that aforementioned, and the density is more than 0.90 g/cm$^3$, preferably more than 0.95 g/cm$^3$, particularly preferably more than 1.00 g/cm$^3$. When the density is less than 0.90 g/cm$^3$, smoothness degrades even if a specific sizing agent is used such as alkylketene dimer, higher fatty acid, higher fatty acid salt, polyvinyl alcohol, rosin or wax emulsion. In the case of coating photographic emulsion, called E slippage (layer slippage of a part of photographic emulsion in multilayer constraction occurring during coating) occurs, and excellent sharpness cannot be obtained. Moreover, edge fouling occurs after wet photographic treatment, and cutability by blade is degraded. The areal weight is preferably 50 to 300 g/m$^2$, particularly preferably 100 to 250 g/m$^2$, most preferably 120 to 200 g/m$^2$. When the areal weight is less than 50 g/m$^2$, the ridigity is insufficient and curling becomes great. When the areal weight exceeds 300 g/m$^2$, the permeation of treating solutions increases from the edges during wet photographic treatment resulting in the occurrence of edge fouling. Furthermore, the cost is increased.

The adhesive layer of the coextruded multilayer is similar to the aforementioned adhesive layer.

The polyolefin resin surface layer contains more than 3 wt. % of light-reflective light-shielding material. The light-reflective light-shielding material may be selected from the following ones, and used as a single material or a mixture of two or more kinds.

The light-reflective light-shielding materials are white pigments, such as titanium oxide (titanium dioxide in rutile type or anatase type is the most preferred), zinc white (zinc oxide), lithopone, lead white, talc, calcium carbonate, satin white, zinc sulfide, aluminum silicate, diatomaceous earth, aluminum powder, aluminum paste, magnesium silicate, calcium chloride, calcium sulfate, kaolin, clay, silicic acid fine powder, calcium hydroxide, magensium hydroxide, tin powder, stainless steel powder, alumina, barium sulfate, magnesium oxide, mica, calcium silicate and magensium carbonate, and metal powders. It is preferable that the light-reflective light-shielding material is coated with lubricant, such as fatty acid metal salt, higher fatty acid, fatty amide or wax, divalent to quadrivalent alcohol, inorganic substance, such as silica or alumina, organopolysiloxane, hydrous aluminum oxide, hydrous aluminum oxide and hydrous silicon dioxide, surfactant or the like, in order to improve dispersibility and photographic properties.

The polyolefin resin surface layer contains the above light-reflective light-shielding material in an amount of more than 3 wt. %, preferably 5 to 40 wt. %, most preferably 7 to 20 wt. %. When the content is less than 3 wt. %, shielding ability is insufficient, and whiteness and resolving power (sharpness) are degraded. Preferable light-reflective light-shielding materials are titanium dioxide, calcium carbonate, zinc oxide, silicon oxide, urea-formalin resin and the like, in terms of shielding power, the improvement in whiteness and sharpness (resolving power) and keeping photographic properties, etc. In view of developing properties, preferable light-reflective light-shielding materials are white inorganic pigments and silver metal powders having a specific gravity of more than 1.4, preferably more than 2.0, most preferably more than 2.5. Titanium dioxide is particularly preferred.

As the polyolefin resin used for the polyolefin resin surface layer, there are the aforementioned ethylene copolymer resins, low density homopolyethylene resin, medium density homopolyethylene resin, high density homopolyethylene resin, homopolypropylene resin, propylene-ethylene block copolymer resin, propylene-ethylene random copolymer resin, propylene-ethylene elastomer, synthetic rubbers, such as polyisobutylene rubber, and the like.

The polyolefin resin layer contains 5 to 95 wt. % of high density homopolyethylene resin having a density of more than 0.940 g/cm$^3$ and/or high density ethylene-α-olefin copolymer resin. The high density homopolyethylene resin is a polymer composed of ethylene alone, and polymerized by the low pressure process or the medium pressure process using a catalyst. The high density ethylene-α-olefin copolymer resin is a polymer having a density of more than 0.940 g/cm$^3$ among the aforementioned L-LDPE resins. The density is preferably 0.940 to 0.970 g/cm$^3$, and 0.945 to 0.960 g/cm$^3$ is particularly preferred. The molecular weight distribution is preferably 2.5 to 8, and 3 to 6 is particularly preferred. The MI is 0.5 to 25 g/10 minutes, preferably 1 to 20 g/10 minutes. When the density of the high density homopolyethylene resin is less than 0.940 g/cm$^3$, it is difficult to improve resistance to curling and cutability by blade. When, $$\text{Molecular weight distribution} = \frac{\text{Weight average molecular weight (}\overline{Mw}\text{)}}{\text{Number average molecular weight (}\overline{Mn}\text{)}}$$

is less than 2.5, neck-in is great during the melt extrusion coating, and lead of extruder is great. When it exceeds 8, film rupture and pinholes tend to occur during the melt extrusion coating. When MI is less than 0.5 g/10 minutes, neck-in is great during the melt extrusion coating and load of extruder is great. When MI exeeds 25 g/10 minutes, film rupture and pinholes occur. When the content of the high density polyolefin resin is less than 5 wt. %, resistance to curling and cutability by blade (cut properties) are degraded. When the content exceeds 95 wt. %, the adhesive strength to the paper support is small in the case of using as a single layer extrusion laminating layer, and separation occasionally occurs during wet photographic treatment. Moreover, neck-in is great, and edge portions become thick and the central portion becomes thin.

Additives and the surface treatment for the purpose of the improvement in adhesive strength are similar to aforementioned ones.

Antioxidant may be blended into the above respective layers in order to improve photographic properties and to prevent the occurrence of lumps, microgrits and coloring troubles.

Examples of the antioxidant are as follows:

Phenol Antioxidants:

6-t-butyl-3-methylphenol derivatives, 2,6-di-t-butyl-p-cresol-t-butylphenol, 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl)propionate]methane, etc.

Ketone-Amine Condensate Antioxidants:

6-ethoxy-2,2,4-trimethyl-1,2-dihydroquinoline, polymers of 2,2,4-trimethyl-1,2-dihydroquinoline, trimethyl-dihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-p-phenylenediamine, N-(3'-hydroxybutylidene)-1-naphthylamine, etc.

Imidazole Antioxidants:

2-mercaptobenzoimidazole, zinc salt of 2-mercaptobenzoimidazole, 2-mercaptomethylbenzoimidazole, etc.

Phosphite Antioxidants:

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:

Thiourea derivatives, 1,3-bis(dimethylaminopropyl)-2-thiourea, etc.

Sulfur-Containing Antioxidants:

Dilaurylthiodipropionate, dimyristylthiodipropionate, laurylstearylthiodipropionate, distearylthiodipropionate, etc.

Other Antioxidants:

Those useful for air oxidation, such as dilauryl thiodipropionate, metal deactivators, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Two or more antioxidants may be combined.

Particularly preferable antioxidants are hindered phenolic antioxidants because of rare adverse affect upon photographic properties of photographic photosensitive materials. The hindered phenolic antioxidants are 1,3,5-trimethyl-2,4,6-tris(3,5-di-tert-butyl-4-hydroxybenzyl)benzene, tetrakis[methylene(3,5-di-tert-butyl-4-hydroxy-hydrocinnamate]methane, octadecyl-3,5-di-tert-butyl-4-hydroxy-hydrocinnamate, 2,2',2'-tris[(3,5-di-tert-butyl-4-hydroxyphenyl)propionyloxy]ethylisocyanurate, 1,3,5-tris(4-tert-butyl-3-hydroxy-2,6-di -methylbenzyl)isocyanrate, tetrakis(2,4-di-tert-butylphenyl)-4,4'-biphenylene diphosphite ester, 4,4'-triobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4-methyl-6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis-(6-tert-butyl-o-cresol), 4,4'-butylidene-bis-(6-tert-butyl-n-cresol) and the like. According to the properties of antioxidants, two or more kinds of antioxidants may be combined. Preferable antioxidants have a melting point of more than 100° C., particularly preferably more than 120° C., because of small bleeding out, thermal decomposition and adverse effect upon photographic photosensitive materials.

A suitable content of the antioxidant is 0.001 to 2 wt. %, preferably 0.01 to 0.5 wt. %, in the case of blending into the polyolefin resin adhesive layer. When the content is less than 0.001 wt. %, the blending effect is small. While, when the content is beyond 2 wt. %, photosensitive materials utilizing oxidation-reduction reaction is adversely influenced by antioxidant, resulting in the occurrence of fogging or sensitivity derivation. Accordingly, it is preferable to blend a minumum amount of the antioxidant which prevents the occurrence coloring trouble or lumps. Vitamine E is particularly preferable because of no adverse affect on human body, a great oxidation inhibition effect on various thermoplastic resins and the improvement in the light-shielding ability. When antioxidant is combined with carbon black, oxidation inhibition effect synergistically appears. The oxidation inhibition effect is particularly exercised by combining a phenol antioxidant, a phosphorous-containing antioxidant and carbon black. Besides, other antioxidants usable in the invention can be selected from those disclosed in "Plastic Data Handbook" (published by Kogyo Chosa Kai), pages 794–799, "Plastic Additives Data Collection" (published by Kagaku Kogyo), pages 327–329, "Plastic Age Encyclopedia, Advance Edition 1986" (published by Plastic Age), pages 211–212, etc.

The paper material for photosensitive materials of the invention is preferably used as the support for photographic printing paper and the like.

In the paper material of the invention, the adhesive layer containing acid-modified adhesive polyolefin resin strongly adheres the surface layer to the paper support.

According to the invention, the adhesive strength of a synthetic resin flim layer to the paper support is improved. Moreover, since the conventional resin layer in solvent type is not used, atmospheric pollution does not occur. Additionally expensive explosionproof equipment is not necessary. When a high speed extrusion laminating coating is conducted, no solvent remains, and blocking and fogging and sensitivity deviation on photographic photosensitive materials do not occur. Moreover, film rupture and pinholes, film cracks, and foaming caused by moisture do not occur. Furthermore, since resin film is formed by coextruding two or more layers, when film rupture, foaming or pinholes occur in one layer, these troubles are recovered by other layers. Accordingly, film rupture and film cracks reduced, even if the thickness is thinned.

Some embodiments of the light-shielding paper for packaging photosensitive materials according to the invention are shown in FIGS. 1 through 10.

The light-shielding paper for packaging photosensitive materials shown in FIG. 1 is formed of a paper support 4a containing light-shielding material and a coextruded multilayer extrusion laminating layer 3a consisting of a surface layer 1a containing light-shielding material and an adhesive layer 2a containing light-shielding material directly laminated onto the paper support 4a.

Figure 2:
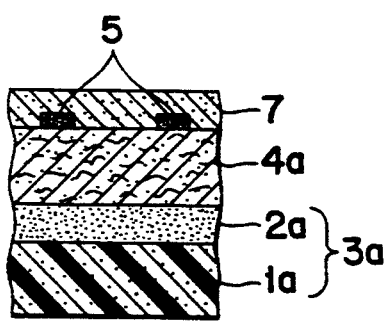

The light-shielding paper for packaging photosensitive materials shown in FIG. 2 is formed of a paper support 4a containing light-shielding material and a coextruded multilayer extrusion laminating layer 3a consisting of a surface layer 1a containing light-shielding material and an adhesive layer 2a containing light-shielding material directly laminated onto the paper support 4a, a print 5 is provided on the surface of the paper support 4a, and a lacquer coat layer is coated onto the print 5.

Figure 3:
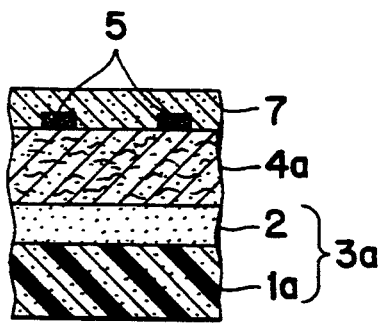

The light-shielding paper for packaging photosensitive materials shown in FIG. 3 is formed of a paper support 4a containing light-shielding material and a coextruded multilayer extrusion laminating layer 3a consisting of a surface layer 1a containing light-shielding material and an adhesive layer 2 not containing light-shielding material directly laminated onto the paper support 4a, a print 5 is provided on the surface of the paper support 4a, and a lacquer coat layer is coated onto the print 5.

Figure 4:
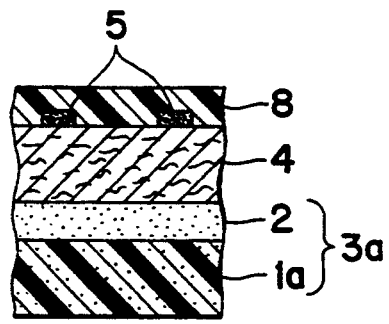

The light-shielding paper for packaging photosensitive materials shown in FIG. 4 is formed of a paper support 4 not containing light-shielding material and a coextruded multilayer extrusion laminating layer 3a consisting of a surface layer 1a containing light-shielding material and an adhesive layer 2 not containing light-shielding material directly laminated onto the paper support 4, a print 5 is provided on the surface of the paper support 4, and a thermoplastic resin extrusion laminating layer 8 is coated onto the print 5.

Figure 5:
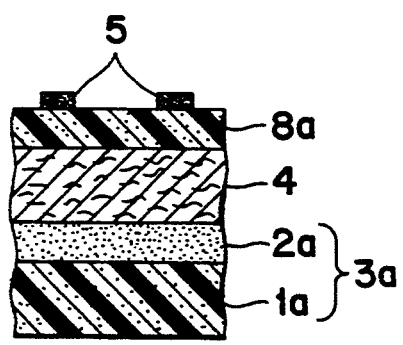

The light-shielding paper for packaging photosensitive materials shown in FIG. 5 is formed of a paper support 4 not containing light-shielding material and a coextruded multilayer extrusion laminating layer 3a consisting of a surface layer 1a containing light-shielding material and an adhesive layer 2 not containing light-shielding material directly laminated onto the paper support 4, and a thermoplastic resin extrusion laminating layer 8a containing light-shielding material is directly laminated onto the other side of the paper support 4. The surface of the thermoplastic resin extrusion laminating layer 8a is treated with corona discharge, and then a print 5 is provided on the surface using UV curing ink.

Figure 6:
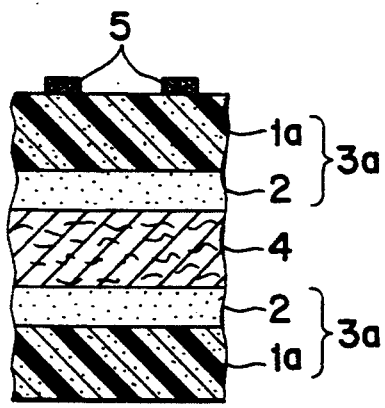

The light-shielding paper for packaging photosensitive materials shown in FIG. 6 is formed of a paper support 4 not containing light-shielding material and coextruded multilayer extrusion laminating layers 3a, 3a consisting of a surface layer 1a containing light-shielding material and an adhesive layer 2 not containing light-shielding material directly laminated onto both sides of the paper support 4. One of the surface of the surface layers 1a is treated with corona discharge, and then a print 5 is provided on the surface using UV curing ink.

Figure 7:
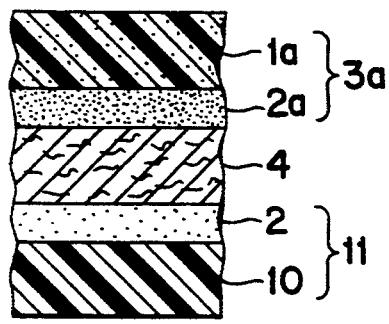

The light-shielding paper for packaging photosensitive materials shown in FIG. 7 is formed of a paper support 4 not containing light-shielding material and a coextruded multilayer extrusion laminating layer 3a consisting of a surface layer 1a containing light-shielding material and an adhesive layer 2a containing light-shielding material directly laminated onto the paper support 4, and a coextruded multilayer extrusion laminating layer 11 consisting of a polyolefin resin layer 10 not containing light-shielding material and an adhesive layer not containing light-shielding material directly laminated onto the other side of the paper support 4.

Figure 8:
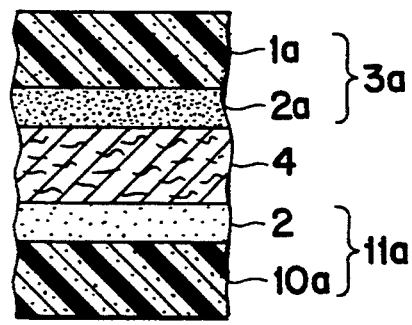

The light-shielding paper for packaging photosensitive materials shown in FIG. 8 is the same as that of FIG. 7, except that the adhesive layer 2a of the coextruded multilayer extrusion laminating layer 3a contains light-shielding material and the polyolefin resin layer 10a contains light-shielding material.

Figure 9:
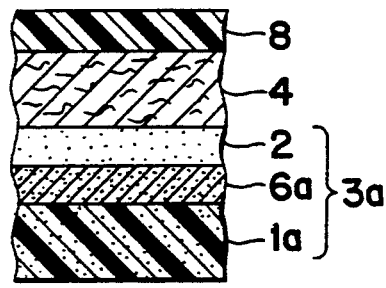

The light-shielding paper for packaging photosensitive materials shown in FIG. 9 is the same as that of FIG. 4, except that the coextruded multilayer extrusion laminating layer 3a further consists of an intermediate layer 6a containing light-shielding material provided between the adhesive layer 2 and the surface layer 1a, and that the print 5 is not provided.

Figure 10:
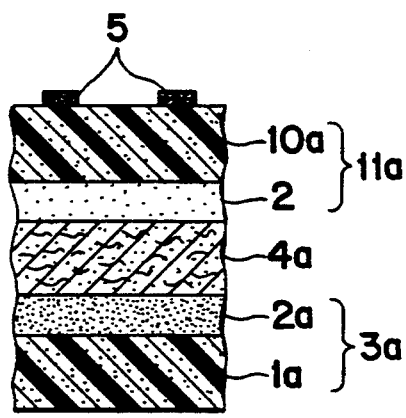

The light-shielding paper for packaging photosensitive materials shown in FIG. 10 is the same as that of FIG. 8, except that the paper support 4a contains light-shielding material and a print 5 is provided on the surface of the polyolefin resin layer 10a.

EXAMPLES

Example I

The light-shielding paper for packaging photosensitive materials of Example I corresponds to FIG. 2.

The paper support 4a was a bleached kraft paper having an areal weight of 70 g/m² containing 5 wt. % of oil furnace carbon black.

The surface layer 1a was composed of 83 wt. % of ethylene-butene-1 copolymer resin ("Idemitsu Polyethylene 1014 D", Idemitsu Petrochemical) having a MI of 10 g/10 minutes and a density of 0.910 g/cm³ containing 6 wt. % of acetylene carbon black ("Denka Black", Denki Kagaku Kogyo), 1 wt. % of sorbitan monostearate and 10 wt. % of acid-modified adhesive polyolefin resin ("Novatec AP", Mitsubishi Chemical Industries) composed of polyethylene resin with graft polymerization of maleic anhydride, and the thickness was 30 μm. The moisture content was 300 ppm, and the resin temperature at the lamination was 290° C.

The adhesive layer 2a was composed of 20 wt. % of acid-modified adhesive polyolefin resin ("Novatec AP", Mitsubishi Chemical Industries) composed of polyethylene resin with graft polymerization of maleic anhydride, 77 wt. % of high pressure low density homopolyethylene resin having a MI of 7.0 g/10 minutes and a density of 0.919 g/cm³ and 3 wt. % of oil furnace carbon black, and the thickness was 10 μm. The moisture content was 100 ppm, and the resin temperature at the lamination was 300° C.

The print 5 indicated design, CI mark, product name, company name, exposure number of photographic film and the like, and printed into multicolor by gravure printing using a UV ink having acrylic unsaturated groups.

The protective layer (lacquer coat layer) 7 was formed of acrylic resin by gravure coating.

Using the light-shielding paper, 120 size roll film (photographic negative color film having a sensitivity of ISO 400) was prepared. In the light-shielding paper, pinholes did not occur at all, and 120 m/minutes of laminating speed was possible. Blocking did not occur. Static marks and light fogging did not occur, and flexibility was 15 g. The cost could be decreased by 20% compared with Conventional Example 1 in EVA resin solution coating type. Since residual solvent is quite absent, photographic properties were not affected adversely. Adhesion with photographic film did not occur at all, and it was very excellent in qualities as light-shielding paper. Atmospheric pollution also did not occur.

Example II

The light-shielding paper for packaging photosensitive materials of Example II corresponds to FIG. 3.

The paper support 4a was a bleached kraft paper having an areal weight of 70 g/m² containing 6 wt. % of conductive carbon black ("Diablack A", Mitsubishi Chemical Industries) and 2.5 wt. % of aluminum sulfate.

The surface layer 1a was composed of 6 wt. % of oil furnace carbon black ("Diablack #44B", Mitsubishi Chemical Industries), 9 wt. % of high pressure branched low density homopolyethylene resin having a MI of 2.4 g/10 minutes and a density of 0.923 g/cm³ (used as masterbatch containing 40 wt. % of carbon black), 84.8 wt. % of a linear low density polyethylene resin composition (pellets of a blend of 80 wt. % of ethylene-butene-1 copolymer resin and 20 wt. % of high pressure branched low density homopolyethylene resin) and 0.2 wt. % of nonionic surfactant ("Electrostripper TS-3", Kao), and the thickness was 30 μm.

The adhesive layer 2 was composed of 10 wt. % of acid-modified adhesive polyolefin resin ("Admer", Mitsui Petrochemical Industries) and 90 wt. % of high pressure low density homopolyethylene resin having a MI of 7.0 g/10 minutes and a density of 0.919 g/cm³, and the thickness was 5 μm. The moisture content was 70 ppm, and the resin temperature at the lamination was 310° C.

The print 5 indicating letters, marks, CI mark and the like which were necessary on function was provided by 5 color printing using inks for gravure printing, in order to increase commercial value.

The protective layer (lacquer coat layer) 6 was provided onto the print 5 by the gravure coating using a solution containing paraffin wax as the principal component.

The light-shielding paper was also excellent in light-shielding, antistatic properties, laminating properties and resistance to pinholes, similar to Example I, and the cost was further decreased than Example I by 5%. Since the masterbatch method was used wherein the masterbatch containing 40% of carbon black having a high moisture content was only 15 parts by weight, the moisture content of the resin composition for the adhesive layer and the resin composition for the surface layer were only 230 ppm. Accordingly, foaming caused by moisture, film rupture and film cracks did not occur, even though the resin temperature was 300° C., and the laminating speed could be elevated to 150 m/minute.

Comparative Example I

The light-shielding paper for packaging photosensitive materials of Comparative Example I was composed of a paper support, a synthetic resin film layer laminated onto one side of the paper support and a print and a protective layer (lacquer coat layer) was provided on the other side.

The paper support was a bleached kraft paper having an areal weight of 70 g/m² containing 5 wt. % of conductive carbon black ("Diablack A", Mitsubishi Chemical Industries).

The synthetic resin film layer was composed of 6 wt. % of oil furnace carbon black ("Diablack #44B", Mitsubishi Chemical Industries) and 94 wt. % of L-LDPE resin which is ethylene-butene-1 copolymer resin having a MI of 10 g/10 minutes and a density of 0.910 g/cm³, and the thickness was 30 μm.

The print was the same as Example I.

The protective layer (lacquer coat layer) was the same as Example I.

Conventional Example I

The light-shielding paper for packaging photosensitive materials of Conventional Example I was composed of a paper support, a synthetic resin layer laminated onto one side of the paper support and a print and a protective layer (lacquer coat layer) was provided on the other side.

The paper support was a bleached kraft paper having an areal weight of 70 g/m² containing 5 wt. % of conductive carbon black ("Diablack A", Mitsubishi Chemical Industries).

The synthetic resin layer was composed of 8 wt. % of oil furnace carbon black ("Diablack #44B", Mitsubishi Chemical Industries) and 92 wt. % of EVA resin, and the thickness was 20 μm. The resin layer was provided by coating by the gravure printing using a toluene solution.

The print was the same as Example I.

The protective layer (lacquer coat layer) was the same as Example I.

Properties of the above Examples I and II, Comparative Example I and Conventional Example I were compared as the light-shielding paper for packaging photosensitive materials which is one of the paper materials for photosensitive materials, and the results are summarized in Table 1.

μm in total thickness by using a T die process simultaneous double layer coextrusion laminater at a resin temperature of 320° C. for the adhesive layer 2 and at a resin temperature of 300° C. for the surface layer 1a. The adhesive layer 2 was a low density homopolyethylene resin layer composed of 20 wt. % of acid-modified ethylene-butene-1 copolymer resin and 80 wt. % of high pressure low density homopolyethylene resin, and the thickness was 5 μm. The surface layer was a polyolefin resin layer composed of 52.95 wt. % of high density homopolyethylene resin having a MI of 4.5 g/10 minutes and a density of 0.960 g/cm³, 30 wt. % of low pressure process ethylene-butene-1 copolymer resin having a MI of 5.5 g/10 minutes and a density of 0.927 g/cm³, 15 wt. % of titanium dioxide of the anatase type treated with hydrous aluminum oxide, 1 wt. % of Ultramarine Blue, 1 wt. % of zinc stearate and 0.05 wt. % of phenolic antioxidant, and the thickness was 25 μm. Onto the reverse surface of the paper support 4, two layer composed of an adhesive layer 2 and a polyolefin resin layer 10 were coated as a simultaneously coextruded double layer extrusion laminating layer 35 μm in total thickness by using a T die process simultaneous

TABLE 1

Figure 11:
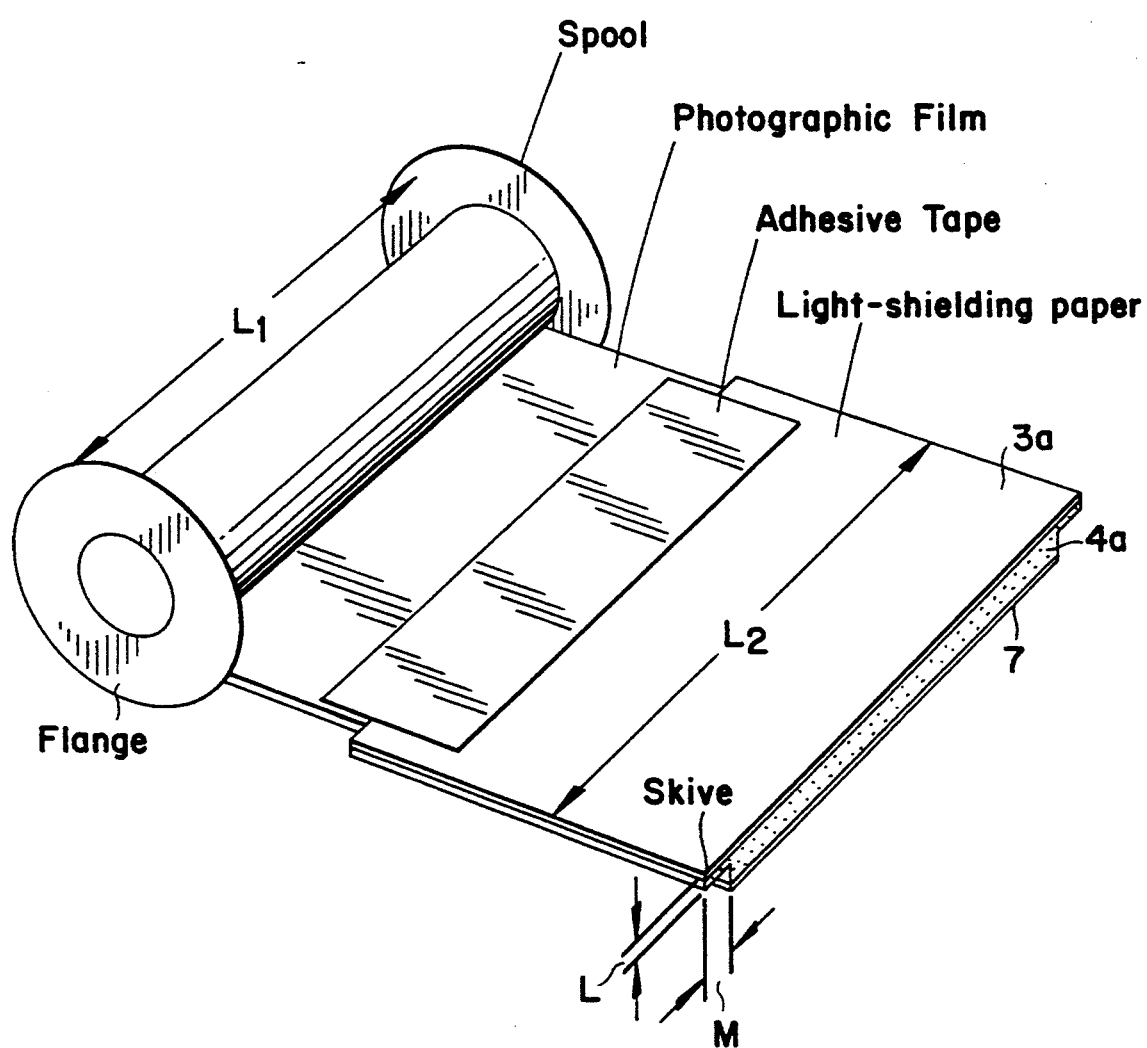
FIG. 11 is a perspective view in a state of applying the paper material for photosensitive materials of the invention to a light-shielding paper of a photographic film.

| Construction | Invention I FIG. 1 | Invention II FIG. 2 | Comparative I FIG. 11 | Conventional I — |
|---|---|---|---|---|
| Light Fogging | No occurrence | No occurrence | Sporadic | Sporadic |
| Pinholes | No occurrence | No occurrence | Sporadic | Sporadic |
| Blocking | No occurrence | No occurrence | Sporadic | Sporadic |
| Adhesive Strength | Very great | Very great | small | Very great |
| of Paper Support-Adhesive Layer | (difficult to separate from paper support) | (difficult to separate from paper support) | (easily separated) | (difficult to separate from paper support) |
| Static Marks | No occurrence | No occurrence | No occurrence | |
| Photographic Properties | Normal | Normal | Normal | Sensitivity deviation, fogging occurred |
| Industrial Waste Problem | None | None | None | Present (necessary to burn toluene) |
| Cost index | 80 | 75 | 95 | 100 |
| Coating Speed | 120m/min. | 150m/min. | 80m/min. | 50m/min. |
| Rigidity | 13 g | 12 g | 15 g | 20 g |

Example III

The support for photographic printing paper of Example III corresponds to FIG. 7.

A mixed paper stock of 60 wt. % of hardwood bleached kraft pulp and 40 wt. % of softwood bleached sulfite pulp was beaten into 350 ml of Canadian Standard Freeness, and 0.25 part by weight of anionic polyacrylamide, 2.5 parts by weight of cationic starch, 0.5 part by weight of alkylketene dimer emulsion and 0.5 part by weight of polyaminopolyamide epichlorohydrin resin were added to 100 parts by weight of the above pulp. A raw paper having an areal weight of 170 g/m² and a moisture content of 8% was made by using a Fourdrinier paper machine, and dried at 120° C. A size solution composed of 3 wt. % of carboxy-modified vinyl alcohol, 0.06 wt. % of fluorescent brightening agent, 0.003 wt. % of blue dye, 0.2 wt. % of citric acid and 96.737 wt. % of water was impregnated in an amount of 22 g/m² into the raw paper from the both sides by a sizing press, dried by hot air at 120° C., and then treated by a supercalender at a line pressure of 100 kg/cm to obtain the paper support 4 having a density of 1.0 g/cm³.

Subsequently, onto the obverse surface of the paper support 4, two layers composed of an adhesive layer 2 and a surface layer 1a were coated as a simultaneously coextruded double layer extrusion laminating layer 30 μm double layer coextrusion laminater at a resin temperature of 320° C. for the adhesive layer 2 and at a resin temperature of 300° C. for the polyolefin resin layer 10. The adhesive layer 2 was a low density homopolyethylene resin layer composed of 20 wt. % of acid-modified ethylene-butene-1 copolymer resin and 80 wt. % of high pressure low density homopolyethylene resin, and the thickness was 5 μm. The polyolefin resin layer was composed of 40 wt. % of high density homopolyethylene resin having a MI of 4.5 g/10 minutes and a density of 0.960 g/cm³, 20 wt. % of the ethylene-butene-1 copolymer resin having a MI of 25 g/10 minutes and a density of 0.920 g/cm³, 39.9 wt. % of high pressure low density homopolyethylene resin having a MI of 5.5 g/10 minutes and a density of 0.927 g/cm³, 0.05 wt. % of phenolic antioxidant and 0.05 wt. % of phosphorus-containing antioxidant, and the thickness was 30 μm. The obverse surface was a glossy surface and the reverse surface was processed into a matte surface. The surface of the surface layer 1a of the support for photographic printing paper was treated with corona discharge, and then the emulsion for color printing paper was coated.

The support for photographic printing paper was excellent in flatness and the adhesive strength between the raw paper and the adhesive layers 2,2 on both sides, and was very excellent in laminating properties (excellent in ducitility, no occurrence of pinholes, laminating speed can be elevated, small die lip fouling and small neck-in). The support did not adversely affect photographic printing paper, such as fogging, yellow stain and sensitivity deviation, and was excellent in cut ability by a guilotine cutter.

EXAMPLE IV

The support for photographic printing paper of Example IV corresponds to FIG. 7.

The paper support 4, the adhesive layer 2 and the adhesive layer 2 on the reverse side were the same as Example III.

The surface layer 1a on the obverse side was a high density homopolyethylene resin layer composed of 62.95 wt. % of medium density homopolyethylene resin having a MI of 5.5 g/10 minutes and a density of 0.935 g/cm$^3$, 20 wt. % of high pressure low density homopolyethylene resin having a MI of 5.0 g/10 minutes and a density of 0.927 g/cm$^3$, 25 wt. % of titanium dioxide of the anatase type treated with hydrous aluminum oxide, 1 wt. % of Ultramarine Blue, 1 wt. % of zinc stearate and 0.05 wt. % of phenolic antioxidant, and the thickness was 25 μm.

The polyolefin resin surface layer on the reverse side was composed of 42.95 wt. % of high density homopolyethylene resin having a MI of 4.5 g/10 minutes and a density of 0.960 g/cm$^3$, 18.5 wt. % of medium density homopolyethylene resin having a MI of 5.5 g/10 minutes and a density of 0.935 g/cm$^3$, 30 wt. % of high pressure low density homopolyethylene resin having a MI of 5.5 g/10 minutes and a density of 0.927 g/cm$^3$, 1.5 wt. % of zinc stearate and 0.05 wt. % of phenolic antioxidant, and the thickness was 30 μm.

Comparative Example II

The support for photographic printing paper of Comparative Example II was composed of a paper support and single layer melt extrusion synthetic resin film layers laminated onto both sides of the paper support.

The paper support was the same as Example III.

The synthetic resin film layer laminated onto the obverse surface of the paper support was a single layer melt extrusion laminating layer having the same resin composition as the surface layer on the obverse side of Example III, and the thickness was 30 μm.

The synthetic resin film layer laminated onto the reverse surface of the paper support was a single layer melt extrusion laminating layer having the same resin composition as the surface layer on the reverse side of Example III, and the thickness was 35 μm.

Comparative Example III

The support for photographic printing paper of Comparative Example III was composed of a paper support and single layer melt extrusion synthetic resin film layers laminated onto both sides of the paper support.

The paper support was the same as Example III.

The synthetic resin film layer laminated onto the obverse surface of the paper support was a single layer melt extrusion laminating layer having the same resin composition as the surface layer on the obverse side of Example IV, and the thickness was 30 μm.

The synthetic resin film layer laminated onto the reverse surface of the paper support was a single layer melt extrusion laminating layer having the same resin composition as the surface layer on the reverse side of Example IV, and the thickness was 30 μm.

The construction and properties of Examples III and IV and Comparative Examples II and III are shown in Table 2 and Table 3 as the support for photographic printing paper which is one of the paper materials for photosensitive materials.

TABLE 2

| | | Example III<br>FIG. 7 | Example IV<br>FIG. 7 |
|---|---|---|---|
| Paper support | | | |
| (Pulp blend) | | LBKP 60 wt. %* NBSP 40 wt. % | LBKP 60 wt. %* NBSP 40 wt. % |
| (Beating rate, Freeness) | | 350 | 350 |
| (Inside size) | | Anionic acrylamide  0.25 wt. %<br>Cationic starch  2.5 wt. %<br>Alkyl Ketone dimer  0.5 wt. %<br>Polyamino polyamide  0.5 wt. %<br>epichlorohydrin | Anionic acrylamide  0.25 wt. %<br>Cationic starch  2.5 wt. %<br>Alkyl Ketone dimer  0.5 wt. %<br>Polyamino polyamide  0.5 wt. %<br>epichlorohydrin |
| (Area weight) | | 170 g/m$^2$ | 170 g/m$^2$ |
| (Surface size solution) | | Carboxy-modified vinyl alcohol:<br>0.3 wt. %, fluorescent brightening<br>agent: 0.06 wt. %, blue dye (Ultra<br>marine Blue): 0.003 wt. %, citric<br>acid (pH adjusting): 0.2 wt. %,<br>water: 96.737 wt. % | Carboxy-modified vinyl alcohol:<br>0.3 wt, %, fluorescent brightening<br>agent: 0.06 wt. %, blue dye (Ultra<br>marine Blue): 0.003 wt. %, citric<br>acid (pH adjusting): 0.2 wt. %,<br>water: 96.737 wt. % |
| (Impregnated amount of Surface size solution) | Simultaneously Coextruded Double | 22 g/m$^2$ on both sides | 22 g/m$^2$ on both sides |
| Supercalender | Layer Laminating | Line pressure: 100 kg/cm | Line pressure: 100 kg/cm |
| Support density after supercalender | Layer 35 μm | 1.0 g/cm$^3$ | 1.0 g/cm$^3$ |
| Obverse Side<br>(Photosensitive material coating side)<br>Surface Layer | | Thickness: 25 μm, HDPE: 52.95 wt. %, L-LDPE: 30 wt. %, TiO$_2$: 15 wt. %, Ultramarine Blue: 1 wt. %, Strearate: 1 wt. %, antistatic agent; 0.05 wt. % | Thickness: 25 μm, MDPE 62.95 wt. %, LDPE 20 wt. %, TiO$_2$: 15 wt. %, Ultramarine Blue: 1 wt. %, Stearate: 1 wt. %, antistatic agent: 0.05 wt. % |
| Adhesive Layer | | LDPE resin layer contg. 20 wt. % acid-modified L-LDPE resin 5 μm thick | LDPE resin layer contg. 20 wt. %, acid-modified L-LDPE resin 5 μm thick |
| Reverse Side (Opposite to photosensitive material coating side) | | | |
| Polyolefin Resin Adhesive | Simultaneously | Same adhesive layer as obverse | Same as surface adhesive layer |

TABLE 2-continued

| Layer | | Example III<br>FIG. 7 | Example IV<br>FIG. 7 |
|---|---|---|---|
| Polyolefin Resin Surface Layer | Coextruded Double Layer Laminating | side 5 μm thick<br>Thickness: 30 μm, HDPE: 40 wt. % L-LDPE: 20 wt. %, LDPE: 39.9 wt. % antistatic agent 0.05 wt % + 0.05 wt. % (2 kinds) | HDPE: 42.95 wt. %, MDPE: 20 wt. %, LDPE: 30 wt. %, antistatic agent: 0.05 wt. % + 0.05 wt. % (2 kinds) |
| Adhesive Strength of Paper Support-Resin lager (Paper support did not activated) | | Very great | Very great |
| Laminating Ability | | Very excellent | Very excellent |

TABLE 3

| | | Comparative Example II<br>FIG. 10 | Comparative Example III<br>FIG. 10 |
|---|---|---|---|
| Paper support | | | |
| (Pulp blend) | | LBKP 60 wt. %* NBSP 40 wt. % | LBKP 60 wt. %* NBSP 40 wt. % |
| (Beating rate, Freeness) | | 350 | 350 |
| (Inside size) | | Anionic acrylamide   0.25 wt. %<br>Cationic starch   2.5 wt. %<br>Alkyl Ketone dimer   0.5 wt. %<br>Polyamino polyamide   0.5 wt. %<br>epictilorohydrin | Anionic acrylamide   0.25 wt. %<br>Cationic starch   2.5 wt. %<br>Alkyl Ketone dimer   0.5 wt. %<br>Polyamino polyamide   0.5 wt. %<br>epichlorohydrin |
| (Areal weight) | | 170 g/m² | 170 g/m² |
| (Surface size solution) | | Carboxy-modified vinyl alcohol: 0.3 wt. %, fluorescent brightening agent: 0.06 wt. %, blue dye (Ultra marine Blue): 0.003 wt. %, citric acid (pH adjusting): 0.2 wt. %, water; 96.737 wt. % | Carboxy-modified vinyl alcohol: 0.3 wt. %, fluorescent brightening agent: 0.06 wt. %, blue dye (Ultra marine Blue): 0.003 wt. %, citric acid (pH adjusting): 0.2 wt. %, water: 96.737 wt. % |
| (Impregnated amount of Surface size solution) | Simultaneously Coextruded Double Layer Laminating Layer 35 μm | 22 g/m² on both sides | 22 g/m² on both sides |
| Supercalender | | Line pressure: 100 kg/cm | Line pressure: 100 kg/cm |
| Support density after supercalendar | | 1.0 g/cm³ | 1.0 g/cm³ |
| Simultaneously Coextruded Double Layer Laminating Layer 35 μm | | | |
| Obverse Side | | | |
| (Photosensitive material coating side) | | Single layer laminating layer 30 μm thick with the same resin composition as the surface layer of Invention III | Single layer laminating layer 30 μm thick with the same resin composition as the surface layer of Invention IV |
| Surface Layer | | | |
| Adhesive Layer | | — | — |
| Reverse Side (Opposite to photosensitive material coating side) | | | |
| Polyolefin Resin Surface Layer | Simultaneously Coextruded Double Layer Laminating Layer 35 μm | Single layer laminating layer 35 μm thick with the same resin composition as the surface layer of Invention III | Single layer laminating layer 30 μm thick with the same resin composition as the surface layer of Invention IV |
| Adhesive Strength of Paper Support-Resin Layer (Paper support did not activated) | | Easily separated | Easily separated |
| Laminating Ability | | Laminating speed decreased by inferior adhesion | Laminating speed decreased by inferior adhesion |

Example V

The light-shielding paper for packaging photosensitive materials of Example V corresponds to FIG. 5.

The light-absorptive light-shielding surface layer 1a was composed of 5 wt. % of oil furnace carbon black as the light-absorptive light-shielding material, 0.5 wt. % of alkylamine lubricant ("Electrostripper TS-2", Kao), 0.2 wt. % of vitamin E, 0.3 wt. % of magnesium stearate, 50 wt. % of ethylene-ethyl acrylate copolymer resin (comonomer content: 18%) having a MI of 6 g/10 minutes and a density of 0.93 g/cm³ and 44 wt. % of high pressure low density homopolyethylene resin having a MI of 5.0 g/10 minutes and a density of 0.918 g/cm³, and the thickness was 25 μm.

The adhesive layer 2a was composed of 2 wt. % of oil furnace carbon black, 25 wt. % acid-modified adhesive polyolefin resin ("CMPS V-70", Mitsui Polychemicals) having a MI of 8 g/10 minutes and a density of 0.922 g/cm³ and 73 wt. % of high pressure low density homopolyethylene resin having a MI of 8.0 g/10 minutes and a density of 0.918 g/cm³, and the thickness was 10 μm.

The coextruded double layer extrusion laminating layer 3a consisting of the light-absorptive light-shielding surface layer 1a and the adhesive layer 2a 35 μm in the total thickness was directly laminated onto a bleached kraft paper support 4 not containing light-shielding material having an areal weight of 70 g/m² and a density of 0.95 g/cm³ at a resin temperature of 310° C.

The thermoplastic resin extrusion laminating layer 8a was a light-reflective light-shielding layer composed of 3 wt. % of titanium dioxide of which the surface was coated with 0.90 wt. % of calcium stearate, 0.1 wt. % of hindered phenolic antioxidant ("Irganox 1010", Ciba-Geigy), 20 wt. % of acid-modified adhesive polyolefin resin "N-Polymer P 4000", Nippon Petrochemicals) having a MI of 8.5 g/10 minutes and a density of 0.90 g/cm$^3$, 60 wt. % high density homopolyethylene resin ("Hizex 2100J", Mitsui Petrochemical Industries) having a MI of 6.0 g/10 minutes and a density of 0.957 g/cm$^3$ and 14 wt. % of high pressure low density homopolyethylene resin having a MI of 9.0 g/10 minutes and a density of 0.917 g/10 minutes, and the thickness was 20 μm.

The thermoplastic resin extrusion laminating layer 8a was directly laminated onto the other side of the paper support 4 at the resin temperature of 315° C., and the surface of the thermoplastic resin extrusion laminating layer 8a was provided with a gravure print 5 of three colors using UV inks.

Using the light-shielding paper, 120 size roll film (photographic negative color film having a sensitivity of ISO 400) was prepared. In the light shielding paper, pinholes did not occur at all, and the laminating speed of the coextruded double layer extrusion laminating layer 3 a was 120 m/minute, and that of the single layer thermoplastic resin extrusion laminating layer 8a was 150 m/minute. Blocking did not occur. Static marks and light fogging did not occur. The cost could be decreased by 30% compared with Conventional Example I in EVA resin solution coating type. Since residual solvent is quite absent, photographic properties were not affected adversely. Adhesion with photographic film did not occur at all, and moistureproofness was excellent. Curling was small, and punching properties (perforating, properties) were excellent. The surface layer 3a had heat sealability with polystyrene spool, and print was sharp because of the white base. Accordingly, the light-shielding paper was very excellent in qualities as commercial goods.

Example VI

The light-shielding paper for packaging photosensitive materials of Example VI corresponds to FIG. 10.

The paper support 4a was sized with alkylketene dimer containing 5 wt. % of carbon black, and had an areal weight of 60 g/m$^2$ and a density of 1.0 g/cm$^3$.

The same coextruded double layer extrusion laminating layer 3a as example V 35 μm in the total thickness was directly laminated onto one side of the paper support 4a at the resin temperature of 310° C.

The thermoplastic resin extrusion laminating layer 8a was a light-reflective light-shielding surface layer composed of 6 wt. % of titanium dioxide of which the surface was treated with hydrous aluminum oxide, 80 wt. % of high density homopolyethylene resin ("Hizex 2100 JH", Mitsui Petrochemical Industries) having a MI of 9.0 g/10 minutes and a density of 0.957 g/cm$^3$ and 14 wt. % of high pressure low density homopolyethylene resin having a MI of 9.0 g/10 minutes and a density of 0.917 g/cm$^3$, and the thickness was 25 μm.

The adhesive layer 2 was composed of 15 wt. % of acid-modified adhesive polyethylene resin ("Novatec AP 170 L", Mitsubishi Chemical Industries) having a MI of 6.0 g/10 minutes and a density of 0.92 g/cm$^3$ and 85 wt. % of high pressure low density homopolyethylene resin having a MI of 7 g/10 minutes and a density of 0.918 g/cm$^3$, and the thickness was 10 μm.

The coextruded double layer extrusion laminating layer 3a consisting of the thermoplastic resin extrusion laminating layer 8a and the adhesive layer 2 35 μm in total thickness was directly laminated onto the other side of the paper support 4a at the resin temperature of 305° C.

The surface of the thermoplastic resin extrusion laminating layer 8a was provided with a gravure print 5 of three colors using UV inks.

Using the light-shielding paper, 120 size roll film (photographic negative color film having a sensitivity of ISO 400) was prepared. All of the properties of the light-shielding paper were further excellent than Example V, except that the cost was higher than Example V by 5% (laminating speed of the layer 8a was decreased from 150 m/minute to 120 m/minute). Particularly, light-shielding ability, laminating properties, adhesiveness to paper support, punching properties and whiteness were much better than Example V, and had a high commercial value.

Example VII

The light-shielding paper for packaging photosensitive materials of Example VII corresponds to FIG. 2.

The paper support 4a was a black paper composed of 40 wt. % of sulfite process hardwood pulp containing 6 wt. % of oil furnace carbon black having a mean particle size of 20 mμ, an oil absorption value of 82 ml/100 g, a volatile component content of 0.25%, a total sulfur content of 0.32% and a cyanide content of 5 ppm and 60 wt. % of kraft process hardwood pulp, and had a surface smoothness of 123 seconds measured by a Bekk smoothness tester, a density of 1.02 g/cm$^3$, an areal weight of 70 g/m$^2$ and a thickness of 69 um. The black paper was excellent in smoothness, and had been rendered smooth by calendering at a calendering pressure of 150 kg/cm per unit length of roll.

The paper support 4a was provided with a light-shielding coextruded extrusion laminating layer 3a 40 μm in thickness consisting of two layers composed of the same surface layer 1a 30 μm in thickness and the same adhesive layer 2a 10 μm in thickness as Example I on the photosensitive material side, and the same print 5 and the same protective layer 7 as Example I were provided on the other side to form the light-shielding paper 111 μm in thickness.

Using the light-shielding paper, 120 size roll film (photographic negative color film having a sensitivity of ISO 400) was prepared. In the light-shielding paper, pinholes did not occur at all. The laminating speed of 180 m/minute was possible due to much more smoothness of the surface of the paper support than Example I (the surface smoothness was improved by 1.7 times from 72 seconds to 123 seconds), and productivity was sharply improved. Blocking did not occur. The adhesive strength of the light-shielding coextruded multilayer extrusion laminating layer 3a was great to the paper support, and cut properties were excellent. Moreover, abrasion, static marks and light fogging did not occur on photosensitive materials, and the flexibility was 12 g which was more excellent than 15 g of Example I. The cost was decreased by 35% compared with Conventional Example I in EVA resin solution coating type. Since residual solvent was quite absent, photographic properties did not affected adversely. Adhesion with photographic film did not occur at all, and the quality as the light-shielding paper was excellent. The light-shielding paper did not induce atmospheric pollution, and was excellent in rejectability. The light-shielding paper was also excellent in dimensional stability compared with conventional one, and had a skiving ability (the processing of thinning at least one edge of the light-shielding paper to less than the mean thickness). Accordingly, it particularly suitable for the use disclosed in Japanese Patent KOKAI No. 4-136842.

Example VIII

The light-shielding paper for packaging photosensitive materials of Example VIII corresponds to FIG. 3.

The paper support 4a was the same black paper as Example III having a surface smoothness of 123 seconds measured by a Bekk smoothness tester, a density of 1.02 g/cm$^3$, an areal weight of 90 g/m$^2$ and a thickness of 69 μm.

The surface layer 1a was composed of ethylene-butene-1 copolymer resin composition having a MI of 5.7 g/10 minutes and a density of 0.903 g/cm$^3$ and containing at least 10 wt. % of the same oil furnace carbon black as in the paper support, 0.2 wt. % of zinc stearate, 0.05 wt. % of vitamin E, 0.05 wt. % of hindered phenolic antioxidant ("Irganox 1001", Ciba-Geigy) and 0.5 wt. % of zeolite having a mean particle size of 2.0 μm, and the thickness was 20 μm. The moisture content was 250 ppm, and the resin temperature at the lamination was 300° C.

The adhesive layer 2 was composed of 10 wt. % of acid-modified adhesive polyolefin resin ("Admer", Mitsui Petrochemical Industries) formed of polypropylene resin with graft polymerization of maleic anhydride and 90 wt. % of high pressure tubular process low density homopolyethylene resin having a MI of 7.6 g/10 minutes and a density of 0.920 g/cm$^3$, and the thickness was 10 μm. The moisture content was 57 ppm, and the resin temperature at the lamination was 310° C.

The coextruded multilayer extrusion laminating layer consisting of the surface layer 1a and the adhesive layer 2 was laminated on the photosensitive material side of the paper support 4a, and the same print 5 and the same protective layer 6 as Example II were provide on the other side to produced the light-shielding paper 100 μm in the total thickness.

The light-shielding paper could be produced continuously through all of a part of 8 processes of pulp beating, papermaking, calendering, double layer coextrusion laminating layer coating on the photosensitive material side, printing on the opposite side, protective layer coating, and both edge trim slitting, and a sharp decrease of the cost was possible. Particularly, since very low density ethylene-α-olefin copolymer resin having a density of 0.870 to 0.910 g/cm$^3$ being very excellent in draw down properties (evaluated by the maximum line speed (in the case of the same thicness) or the minumum thickness where film rupture occurred by extrusion molding of molten resin at 300° C. from T die and winding up) was used for the surface layer 1a of the coextruded double layer laminating layer which determined the speed, various advantages were obtained, such as thinning the thickness from 30 μm to 20 μm, increasing carbon black content from 6 wt. % to 10 wt. %, increasing the laminating speed to 200 m/minute by the synergistic effect with the improvement in smoothness of the paper support. As a result, the cost was further decreased by 15% compared with this Example.

The problem of blocking which is the greatest problem of very low density ethylene-α-olefin copolymer resin could be prevented by blending zinc stearate and zeolite. Since zinc stearate which was lubricant covered the surface of oil furnace carbon black, improved dispersibility and neutralized to render harmless the halogen compound which was the polymerization catalyst of the very low density ethylene-α-olefin copolymer resin and adversely affected photographic properties of photosensitive materials such as fogging, the surface layer was excellent in appearance and the occurrence of microgrits and pinholes were rare. In the past, it was prohibited to use or limited to a content in a ppm level of lubricant and antioxidant for extrusion laminating layers because of the decrease of adhesive strength to paper support, the degradation of heat sealability and the like due to gradual bleeding out. Not only all of these problems were resolved but also most of favorable properties were excercised synergistically by using the coextruded multilayer extrusion laminating layer comprising the surface layer comprising very low density ethylene-α-olefin copolymer which is very excellent in heat sealability and the adhesive layer comprising acid-modified adhesive polyolefin resin. By blending zeolite, which was not used for the light-shielding paper for photosensitive materials heretofore, into the surface layer on the photographic film side, the surface layer was made so as not to adhere to the photographic film. Zeolite also adsorbed harmful substances and odor of the additives in the photographic film. The light-shielding paper was further inexpensive, excellent in laminating properties and flexibility (10 g) than Examples I to III, and was excellent in light-shielding, resistance to pinholes, adhesive strength, prevention of odor, slipping character and the like.

Example IX

The light-shielding paper for packaging photosensitive materials of Example IX corresponds to FIG. 5.

The paper support 4 was an unbleached kraft paper composed of 70 wt. % of kraft process hardwood pulp and 30 wt. % of kraft process softwood pulp, and had an areal weight of 50 g/m$^2$, a density of 0.95 g/cm$^3$, a thickness of 53 μm and a smoothness of 83 seconds.

The surface layer 1a was composed of 74 wt. % of homopolyethylene resin having a MI of 20 g/10 minutes and a density of 0.948 g/cm$^3$, 5 wt. % of the same oil furnace carbon black as Example IV, 20 wt. % of ethylene-butene-1 copolymer resin having a MI of 20 g/10 minutes and a density of 0.925 g/cm$^3$, 0.05 wt. % of erucic amide, 0.15 wt. % of magnesium stearate and 0.2 wt. % of antistatic agent ("Electrostripper TS-2", Kao), and the thickness was 25 μm.

The adhesive layer 2a had the same resin composition and the same thickness as Example I.

The light-absorptive light-shielding coextruded double layer 3a 30 μm in the total thickness consisted of the above surface layer 1a and the adhesive layer 2a.

The light-shielding thermoplastic resin extrusion laminating layer 8a was a light-reflective light-shielding layer composed of 10 wt. % of titanium dioxide of the anatase type of which the surface was treated with hydrous aluminum oxide. 50 wt. % of homopolyethylene resin having a MI of 30 g/10 minutes and a density of 0.951 g/cm$^3$, 30 wt. % of homopolyethylene resin having a MI of 20 g/10 minutes and a density of 0.920 g/cm$^3$ and 10 wt. % of acid-modified adhesive polyolefin resin ("Novatec AP", Mitsubishi Chemical Industries) formed of polypropylene resin with graft polymerization of maleic anhydride, and the thickness was 20 μm.

The print 5 was formed by printing a UV ink called reinforced ink on the surface of the light-shielding thermoplastic resin extrusion laminating layer 8 which was heated to 40° to 100° C., and curing by UV irradiation.

The light-shielding paper had a great adhesive strength between the paper support and the light-absorptive light-shielding coextruded double layer extrusion layer 3a and between the paper support and the light-shielding thermoplastic resin extrusion laminating layer 8a which was the light-reflective, light-shielding layer, and separation did not occur through cutting. The cut end was simple, and excellent in cut properties. It was also excellent in light-shielding, antistatic properties, laminating properties and resistance to pinholes, and particularly excellent in the shapness of ink and surface strength. Moreover, since the obverse side and the reverse side had a different color, these sides could easily be discriminated, and working efficiency in a dark room was sharply improved. Since the paper support was not a black paper but an unbleached kraft paper, there was no problem of pollution, and it was inexpensive. Since the print face was a light-reflective white light-shielding layer, it was excellent in the reproducibility of fine letters and color.

Comparative Example IV

The paper support was the same as the light-shielding paper support 4a of Example VI. A single layer light-absorptive light-shielding layer 25 μm in thickness which was the same as the light-absorptive light-shielding surface layer 1a 25 μm in thickness of Example VI was directly laminated onto one side of the paper support 4a at a resin temperature of 310° C., and a single layer light-reflective light-shielding layer 25 μm in thickness which was the same as the thermoplastic resin extrusion laminating layer 8a 25 μm in thickness which was the light-reflective light-shielding layer of Example VI was directly laminated onto the other side of the paper support 4a at a resin temperature of 305° C.

The single layer light-absorptive light-shielding layer 25 μm in thickness had a small adhesive strength and was inferior in laminating properties. Unevenness occurred in thickness, and there was a problem in light-shielding.

The single layer light-reflective light-shielding layer had a further small adhesive strength, and was inferior in draw down (ductility in a melted state). Unevenness occurred in thickness, and film cracks were occasionally generated resulting in the difficulty of stable extrusion laminating.

I claim:

1. A paper material for photosensitive materials consisting essentially of a paper support having a thickness of 30 to 330 microns and an areal weight of 30 to 300 g/m² and a coextruded multilayer extrusion laminating layer laminated onto the paper support, wherein said coextruded multilayer extrusion laminating layer comprises an adhesive layer comprising less than 5 wt. % of carbon black and 5 to 90 wt. % of acid-modified adhesive polyolefin resin laminated onto the paper support and a surface layer comprising more than 3 wt. % of carbon black and more than 10 wt. % of ethylene copolymer resin having a melt index of more than 2 g/10 minutes.

2. A paper material for photosensitive materials consisting essentially of a paper support having a density of more than 0.80 g/cm³, a thickness of 30 to 330 microns and an areal weight of 30 to 300 g/m², a coextruded multilayer extrusion laminating layer laminated onto one side of the paper support, and a polyolefin resin extrusion laminating layer having a thickness of 5 to 7 microns containing 5 to 95 wt. % in the total content of either or both of high density homopolyethylene resin having a density of more than 0.940 g/cm³ and ethylene-α-olefin copolymer resin laminated onto the other side, the coextruded multilayer extrusion laminating layer comprising an adhesive layer comprising 5 to 90 wt. % of acid-modified adhesive polyolefin resin laminated onto the paper support and a polyolefin resin surface layer containing more than 3 wt. % of light-reflective light-shielding material.

3. A paper material for photosensitive materials consisting essentially of a paper support having a thickness of 30 to 330 microns and an areal weight of 30 to 300 g/m², a light-absorptive coextruded multilayer extrusion laminating layer comprising a surface layer containing light-absorptive light-shielding material and an adhesive layer containing 5 to 90 wt. % of acid-modified adhesive polyolefin resin laminated onto one side of the paper support and a light-reflective coextruded multilayer extrusion laminating layer comprising a surface layer containing light-reflective light-shielding material and an adhesive layer of which the light-shielding material content is less than 3 wt. % laminated onto the other side of the paper support.

4. A paper material for photosensitive materials consisting essentially of a paper support having a thickness of 30 to 330 microns and an areal weight of 30 to 300 g/m², a light-absorptive coextruded multilayer extrusion laminating layer comprising a surface layer consisting of thermoplastic resin containing 3 to 20 wt. % of black pigment and having a moisture content of less than 600 ppm and an adhesive layer comprising 5 to 90 wt. % of acid modified adhesive polyolefin resin of which the light-shielding material content is less than 5 wt. % and the moisture content is less than 500 ppm laminated onto one side of the paper support by extrusion laminating, and a light-reflective coextruded multilayer extrusion laminating layer comprising a surface layer consisting of thermoplastic resin containing 3 to 40 wt. % of light-reflective light-shielding material and having a moisture content of less than 600 ppm and an adhesive layer consisting of polyolefin resin of which the light-shielding material content is less than 3 wt. % and the moisture content is less than 500 ppm laminated onto the other side of the paper support by extrusion laminating, and at least one of the surface layers containing 5 to 95 wt. % of the total content of either or both of high density homopolyethylene resin having a density of more than 0.940 g/cm³ and ethylene-α-olefin copolymer resin.

5. A paper material for photosensitive materials comprising a paper support formed of wood pulp containing 30 to 100% of hardwood pulp having a Bekk smoothness of more than 90 seconds, a density of 0.7 to 1.3 g/cm³, thickness of 30 to 150 μm and an areal weight of 30 to 120 g/m², and a coextruded multilayer extrusion laminating layer laminated to the paper support, and the coextruded multilayer extrusion laminating layer comprising an adhesive layer of which the carbon black content is less than 5 wt. % and the acid-modified adhesive polyolefin resin content is 5 to 90 wt. % laminated onto the paper support and a surface layer comprising more than 3 wt. % of a light-absorptive light-shielding material selected from the group consisting of carbon black, graphite and titanium nitride, more than 10 wt. % of ethylene-α-olefin copolymer resin having a density of 0.87 to 0.94 g/cm$^3$ and a melt index of 1 to 40 g/10 minutes produced by using a Ziegler catalyst, at least one member selected from the group consisting of lubricant, silicon dioxide and zeolite and antioxidant.

6. The paper material of claim 5 wherein the surface layer contains 0.01 to 1 wt. % of silicon dioxide having a mean particle size of 0.05 to 8 μm, 0.01 to 1 wt. % of zeolite having a mean particle size of 0.1 to 15 μm and 0.01 to 5 wt. % in the sum of either or both of fatty amide lubricant and fatty acid metal salt.

7. The paper material of claim 1 or 5 wherein the ethylene copolymer resin in the surface layer is very low density ethylene-α-olefin copolyer resin having a density of 0.87 to 0.91 g/cm$^3$.

8. A paper material for photosensitive materials consisting essentially of a paper support, a thickness of 30 to 330 microns and an areal weight of 30 to 300 g/m$^2$, a black coextruded multilayer extrusion laminating layer comprising a surface layer containing black light-shielding material and an adhesive layer comprising 5 to 90 wt. % of acid-modified adhesive polyolefin resin laminated on the photosensitive material side, and a light-reflective thermoplastic resin extrusion laminating layer containing light-reflective light-shielding material having a refractive index of more than 1.51 laminated on the other side of the paper support.

9. The paper material of claim 1, 2, 3, 4, 5 or 8, wherein a skiving having a depth of 30 to 100 μm in the thickness direction and a width of 0.5 to 2 mm in the cross direction is provided on both side ends of the paper material.

10. The paper material of claim 1, 2, 3, 4, 5 or 8, wherein the static friction coefficient is 0.1 to 0.5 between the surface layer and photographic film.

11. The paper material of claim 1, 2, 3, 4, 5 or 8, wherein the thickness ratio of the adhesive layer is 1 to 50% and that of the surface layer is 99 to 50% of the coextruded multilayer extrusion laminating layer.

12. The paper material of claim 1, 2, 3, 4, 5 or 8, wherein the paper support comprises more than 70 wt. % of wood pulp having a mean fiber length of 0.4 to 0.9 mm, a mean fiber width of more than 10 μm and a mean fiber thickness of less than 5 μm, and has a density of 0.8 to 1.2 g/cm$^3$ and a Bekk smoothness of more than 90 seconds.

13. The paper material of claim 1, 2, 3, 5 or 8, wherein the paper support contains an inorganic material having ion-exchange ability in an amount of 0.1 to 10 wt. % and light-shielding material.

14. The paper material of claim 12, wherein the paper support contains an inorganic material having ion-exchange ability in an amount of 0.1 to 10 wt. % and light-shielding material.

* * * * *